United States Patent [19]

Bailey

[11] Patent Number: 4,829,493
[45] Date of Patent: May 9, 1989

[54] SONAR FISH AND BOTTOM FINDER AND DISPLAY

[75] Inventor: James B. Bailey, Abbeville, Ala.

[73] Assignee: Techsonic Industries, Inc., Eufaula, Ala.

[21] Appl. No.: 745,133

[22] Filed: Jun. 14, 1985

[51] Int. Cl.$^4$ .......................... G01S 15/08; G01S 15/60
[52] U.S. Cl. ...................................... 367/111; 181/124; 367/908; 367/108
[58] Field of Search ................. 367/11, 111, 108, 107, 367/95, 71, 908; 358/112; 340/731, 724, 621; 73/290 V; 181/124

[56] References Cited

U.S. PATENT DOCUMENTS

| | | |
|---|---|---|
| 3,098,210 | 4/1957 | Sparling et al. . |
| 3,363,226 | 1/1968 | Murphree . |
| 3,497,867 | 2/1970 | Bolzmann et al. ..................... 367/98 |
| 3,573,790 | 4/1971 | Schulenburg, Sr. et al. . |
| 3,683,373 | 8/1972 | Barnes et al. . |
| 3,719,920 | 3/1973 | Grada et al. . |
| 3,761,873 | 9/1973 | Hopkin . |
| 3,787,802 | 1/1974 | Brahman ............................... 367/95 |
| 3,797,014 | 3/1974 | Tompkins et al. . |
| 3,827,027 | 7/1974 | Towson et al. . |
| 3,886,487 | 5/1975 | Walsh et al. ......................... 367/115 |
| 3,942,149 | 3/1976 | Westfall, Jr. . |
| 4,024,490 | 5/1977 | Wood et al. . |
| 4,096,484 | 6/1978 | Ferre et al. . |
| 4,104,609 | 8/1978 | Minegishi et al. . |
| 4,107,673 | 8/1978 | Gross et al. . |
| 4,115,752 | 9/1978 | Hertel . |
| 4,179,681 | 12/1979 | Zehner et al. . |
| 4,228,435 | 10/1980 | Nevin . |
| 4,236,233 | 11/1980 | Davis, Jr. et al. ..................... 367/71 |
| 4,300,216 | 11/1981 | Barton, Jr. . |
| 4,322,827 | 3/1982 | Weber . |
| 4,347,591 | 8/1982 | Stembridge et al. . |
| 4,409,827 | 10/1983 | Overs . |
| 4,420,824 | 12/1983 | Weber . |
| 4,467,461 | 8/1984 | Rice ...................................... 367/71 |
| 4,494,212 | 1/1985 | Muellner . |
| 4,520,671 | 6/1985 | Hardin ................................. 340/731 |
| 4,546,349 | 8/1985 | Drohofsky et al. ................. 340/731 |
| 4,574,279 | 3/1986 | Roberts ............................... 340/731 |
| 4,597,069 | 6/1986 | Milano et al. . |

OTHER PUBLICATIONS

Model 480 Instruction Manual, 1983.
Bottom line User's Manual, 1986.
Bottom line Press Release, 11-22-1984.

Primary Examiner—Thomas H. Tarcza
Assistant Examiner—Daniel T. Pihulic
Attorney, Agent, or Firm—Jones, Askew & Lunsford

[57] ABSTRACT

An improved microprocessor-controlled sonar depth sounder, which is automatically operative to detect and lock to the bottom of a body of water, fill in the display below the detected bottom, change display scales in response to the detected bottom going off-scale, and reformat the entire display in response to a scale change. A memory is provided for storing target data up to the operable depth limits of the device, thereby allowing display reversing and display expansion or "zoom" of a predetermined portion of the display selected by a zoom cursor. The zoom or cursor is variably positionable at different depths. The device employs an improved variable sensitivity amplifier. Also disclosed is an improved water-resistant switch construction for marine electronic equipment.

42 Claims, 9 Drawing Sheets

SONAR FISH AND BOTTOM FINDER AND DISPLAY

TECHNICAL FIELD

The present invention relates generally to sonar apparatus for fishing, boating, and depth sounding and more particularly relates to an improved sonar depth sounder having improved display characteristics which facilitate target detection, review of target data from previous sonar returns, scale expansion of selected areas on the display, automatic bottom detection and fill-in, automatic display scale change, display reformatting in response to scale changes, and the like.

BACKGROUND OF THE INVENTION

Sonar devices are frequently used by sport fisherman and boaters. These devices include means for generating high-frequency sound pulses and receiver/transducer means responsive to reflected sound pulses for acquiring target data such as the location of fish and underwater obstacles, and the depth of the bottom of the body of water. Typically, the sonar apparatus generates a series of pulses of sound at periodic intervals, receives reflected sound pulses or echoes from underwater objects, and displays either a depth readout of a target or the location of a target on a linear or curvilinear array scaled as to depth, which is a function of the time elapsed between the transmission of the sound pulses until reception of the reflected echo.

In prior art depth sounders, various methods are used to display the reflected sound pulses or "sonar returns" as a function of depth. Rotating disk lamps or "flashers", chart recorders, and numerical digital depth readouts are commonly employed to indicate the depth of a sonar return. These types of displays suffer from various disadvantages which are either inconvenient or annoying to a user.

One problem with many prior art apparatus is that a user must interpret the display to determine the bottom of the body of water since the display is typically a linear or curvilinear scale which extends to the extent of the capability of the apparatus. The bottom return in some devices such as chart recorders typiclly appears as a wide area or band on the display, but conditions such as thermocline and multiple returns caused by reflection from the boat bottom or other sources create additional sonar returns indicated as occurring at depths above or below the actual bottom, tending to make interpretation more difficult.

Some prior art linear or curvilinear displays such as flashers are only one-dimensional, in that the linear or curvilinear display can only display information for a single transmission. A sonar return subsequent to a currently-displayed return is erased or overwritten by new information. If a moving target is detected, the target such as a fish may disappear from the display after the next transmission, and the user may miss the target if the display has not been constantly watched.

In order to overcome the disadvantages of a one-dimensional display, other prior art sonar apparatus employ a chart-printing device or a cathode ray tube (CRT) to provide a two-dimensional display which lowers the risk of missing targets. Some of these devices include scale-changing features which allow different depth scales to be selected and associated with the display. However, when a scale change is made, a discontinuity at the point of the scale change makes interpretation of the display difficult. For example, if a target is detected at 15 feet on a 60 foot nominal scale, and the scale of the display is changed to 120 foot nominal depth, the previously detected target at 15 feet will remain in the same relative position on the display, since the device cannot go back and "rewrite" what has previously been written. However, new returns for the same target at 15 feet will appear at a different location on the display in the 120 foot nominal depth scale. Thus, the target will appear to have shifted upwardly on the display. Discontinuities such as these create confusion in display interpretation.

Some prior art sonar apparatus include a scale expansion feature wherein the depth scale is expanded by a predetermined factor two, e.g. U.S. Pat. No. 4,322,827 to Weber. Other prior art devices include a scale expansion feature wherein an upper depth limit and a lower depth limit are keyed into the device, so that target data detected within these depth limits can be expanded to fill the display. Still other types of displays include prepicked scale expansion regions having a fixed number of fixed limit expansion regions.

All of these prior art approaches to display expansion are subject to criticism. The predetermined factor of two approach, while simple, cannot be used to "zero in" on a selected area for expansion. The selectable upper and lower limit approach requires the user to enter the limit data via a keypad, requiring mental calculations to determine the appropriate areas for display expansion. The prepicked expansion lies close to a boundary between expansion regions, so that selection of one expansion region followed by movement of the target requires the user to re-enter the expansion selection mode and select another expansion region.

Other problems exist in prior art sonar apparatus. A particular problem occurs in sonar apparatus having automatic gain control. For example, U.S. Pat. No. 4,420,824 to Weber entitled "SONAR APPARATUS HAVING IMPROVED GAIN CONTROL" discloses an apparatus wherein a microprocessor controls the gain of the receiver stage so that the gain of the receiver is automatically increased as the anticipated bottom depth increases. In this apparatus, the gain is set at a minimum at the time of and immediately succeeding a sonar transmission and as time increases, the receiver gain is increased in anticipatiion of weaker signals which correspond to greater depths.

A particular problem with variable gain amplifier circuits is that changing amplifier gain often creates transients which if not properly handled can appear as target returns. Typically, additional filters or other signal processing circuits required to suppress the transients or otherwise assure that the transients are not treated as a valid return signal.

Moreover, troubleshooting of variable gain amplifiers is difficult in that a repair technician is required to have detailed information as to expected outputs for a wide range of input signals. This typiclly entails employing a variety of input signal settings and adjustments in order to isolate a particular faulty component in a variable gain amplifier.

Another problem frequently encountered in marine sonar apparatus is providing a watertight enclosure to protect the electrical circuitry which still allows a convenient user interface. Individual waterproof switches are expensive and are still prone to leaks in that a separate seal for each of a plurality of switches increases the probability that one or more of the switch seals will fail under adverse climatic conditions. Significant improvement in weatherability could be obtained by minimizing the number of places requiring weatherproof seals.

SUMMARY OF THE INVENTION

The present invention overcomes these and other problems in prior art sonar depth sounder apparatus and displays therefore by providing an improved sonar apparatus comprising a microprocessor-driven two-dimensional liquid crystal display (LCD) screen for displaying sonar target data. Target data or sonar returns are initially displayed at an initial position (at one side) of the display, and scrolled across the display toward the opposite side. Target data are digitized and stored in an addressable memory, which in one preferred embodiment holds almost two full screens' worth of data. The apparatus includes features such as automatic bottom detection and display fill-in below the detected bottom. Automatic display scale changing is provided in response to the detected bottom going off-scale, or in response to the detected bottom rising to within a predetermined depth.

Of particular significance in the present invention is the feature of total display reformatting or rescaling in response to a scale change or selection of a display expansion mode. Even prior displayed target data from prior sonar returns is updated or reformatted to relate to the new depth scale, thereby eliminating discontinuities in the display.

Target data from such prior returns is recalled from memory and rescaled, and the entire screen is changed to correspond to the new depth scale. Moreover, the memory facilitates reverse scrolling of the display from left to right, to review target data which has gone "off screen". The apparatus includes automatic sensitivity control in the receiver stage rather than variable gain amplifiers, to eliminate transients and simplify trouble shooting.

A variably positionable zoom or expansion region is provided which allows selection of an area of interest for range expansion and closer inspection. Additionally, an improved switch construction minimizes the number of weathetight seals and reduces the probability of leaks due to inclement weather.

More particularly described, the present invention comprises a sonar echo ranging depth sounder apparatus including sonar pulse generating means and transducer means responsive to reflected sonar pulses for acquiring target data representative of reflected sonar pulses. An addressable memory stores a plurality of reflected target signals in a plurality of addressable locations. A control circuit, a programmed microcomputer in the preferred embodiment, is responsive to store target signals in the memory and to retrieve stored target signals from the memory for display.

A liquid cyrstal display (LCD) screen comprising a two-dimentsional matrix of addressable picture elements ("pixels") is responsive to retrieved target signals provide by the control circuit to display the retrieved target signals at locations on te display which correspond to a selected one of a plurality of depth scales. The display is responsive to simultaneously display a plurality of retrieved target signals corresponding to a plurality of prior sonar signal returns. The display is operative to display retrieved target signals corresponding to the most recent sonar return at the rightmost position on the display. The display then successively shifts or scrolls this particular data one position leftwardly as new sonar returns are received. Thus, the most recent sonar return is always displayed on the right of the display.

All data displayed on the screen are associated with a particular selected depth scale. A different display scale may be selected either manually or automatically by automatic bottom tracking means. The present invention further comprises scale changing means responsive to a scale reselection to reformat all displayed information to associate the entire display screen with the new depth scale. In particular, the apparatus of the preferred embodiment is responsive to detect the bottom of the body of water, and automatically select a deeper scale when the detected bottom goes "off scale". The entire display screen is then reformatted to reflect the new, deeper scale.

In the preferred embodiment, when the detected bottom rises to within a predetermined depth, the next shallower scale is selected, and the entire display is reformatted to reflect the new, shallower depth scale.

The present invention further comprises display bottom fill-in means responsive to the detected bottom to fill in or "paint" areas of the display below the detected bottom. This eliminates ambiguities in te display resulting from multiple echoes or thermoclines, which sometimes makes display interpretation more difficult.

The present invention also comprises means for selecting a predetermined portion of displayed target data for expanded display or "zoom". The selectable portion corresponds to a variably positionable "zoom" or expansion region, which may be positioned by the operator at varying depths to select an area of interest for display expansion. Upon selecting the zoom mode, the display expands only the portion of target data within the zoom region depths, and reformats the entire display screen to correspond to the depth range of the zoom region.

Still more particularly described, the addressable memory employed in the disclosed embodiment stores target return data for the entire operable range of the apparatus. For example, in one disclosed embodiment the operable range is 120 feet of depth; target data for every three inches of depth down to 120 feet are stored in memory. In this disclosed embodiment, four different depth scales may be selected for viewing this data: 15 feet, 30 feet, 60 feet, and 20 feet. When a particular depth range or scale is selected, the portion of stored data corresponding to target data within the selected depth range is displayed. Accordingly, and although a user may be viewing data at a 30 foot depth scale or may be viewing an area of interest in the zoom mode, sonar returns for targets as deep as 120 feet are being stored in memory, and can be recalled from memory and displayed in response to selection by the operator of the 120 foot depth scale or upon leaving the zoom mode. Therefore, the present invention minimizes the likelihood of missing targets.

The memory also allows display reversal. The memory stores up to two full screens of target information; by selecting a "reverse" mode, previously displayed and stored target data is recalled from memory and scrolled onto the screen from the leftmost position until the memory is exhausted. Advantageously, an area which had been previously viewed can be recalled for scale expansion, zooming, and closer study even after the area has been physically passed over in the boat.

The apparatus further includes an improved weather resistant electrical switch panel. A switch housing defines a waterproof interior area for enclosing electrical circuitry associated with the apparatus. A planar plastic overlay formed of a waterproof resilient plastic material forms the switch panel, and includes a plurality of dome-shaped protrusions which extend outwardly of the switch housing and define actuator domes or buttons. The overlay layer is sealed to the housing along a perimeter of an opening in the housing, and is the only seal required. Electrical switches mounted within the housing include an actuator arm which extends into the actuator button of the overlay. When the dome-shaped protrusion is depressed by an operator, the dome collapses radially inwardly and depresses the actuator arm of the switch, causing the switch to make the electrical contacts. Upon release by the operator, the resilience of the plastic material causes the dome-shaped protrusion to return to its dome-shaped configuration. Advantageously, only the single perimeter seal between the outer periphery of the overlay and the housing is required, and there are no individual seals required for individual switches.

Accordingly, it is an object of the present invention to provide an improved sonar depth sounder apparatus.

It is another object of the present invention to provide an improved display for sonar depth sounders.

It is another object of the present invention to provide a sonar depth sounder apparatus including automatic bottom detection and display fill-in below the detected bottom.

It is another object of the present invention to provide an improved sonar depth sounder apparatus having automatic scale changing in response to the detected bottom going off scale of a selected scale.

It is another object of the present invention to provide an improved sonar depth sounder apparatus wherein a shallower scale is automatically selected in response to the detected bottom rising to within a predetermined depth.

It is another object of the present invention to provide an improved sonar depth sounder apparatus which reformats all the information displayed in the display area of the screen in response to a scale change or selection of an expansion mode, to eliminate discontinuities in the display.

It is another object of the present invention to provide an improved sonar depth sounder apparatus which includes a memory for storing target data for a plurality of sonar returns greater than the number of returns which can be simultaneously displayed.

It is another object of the present invention to provide an improved sonar depth sounder apparatus which includes a memory for storing sonar return target data at maximum resolution for the entire operational depth range of the apparatus, yet which allows display of only a selectable portion of the stored data for improved display expansion.

It is another object of the present invention to provide abn improved depth sounder apparatus including a memory for storing target data for a plurality of returns which allows display reversal or screen recall, to permit review or closer study of prior sonar returns which are not currently displayed.

It is another object of the present invention to provide an improved sonar depth sounder apparatus having a variably positionable zoom or expansion region.

It is another object of the present invention to provide an improved sonar depth sounder apparatus having a zoom or expansion capability wherein information in the expansion mode is displayed at maximum resolution.

It is another object of the present invention to provide an improved sonar depth sounder apparatus including a zoom or expansion capability which reformats all displyed information within the zoom or expansion region to eliminate discontinuities and ambiguities in the display.

It is another object of the present invention to provide an improved sonar depth sounder apparatus having variable amplifieer sensitivity to eliminate transients associated with gain changing and obviate additional signal filtering.

It is another object of the present invention to provide an improved sonar depth sounder apparatus having an automatic sensitivity selection wherein amplification is constant and which is easy to troubleshoot.

It is another object of the present invention to provide an improved weathertight switch panel construction for use in marine electronic equipment.

These and other objects, features, and advantages of the present invention may be more clearly understood and appreciated from a review of the following detailed description of the disclosed embodiments and by reference to the appended drawings and claims.

Appendix I is a dictionary of variable names employed in the program for the microcomputer employed in the preferred embodiment.

Appendix II is a table illustrating the display memory map of the preferred embodiment.

Appendix III is a table illustrating the display temporary memory map employed in the preferred embodiment.

Appendix IV is a table illustrating the sensitivity look-up values referred to by the microcomputer in the preferred embodiment.

Appendix V is a filter look-up table referred to by the microcomputer in the preferred embodiment.

Appendix VI is a table illustrating the memory map of the target data range table employed in the preferred embodiment.

Appendix VII is a table illustrating the memory map of the depth range look-up table referred to by the microcomputer in the preferred embodiment.

Appendix VIII is a table illustrating the sensitivity values indexed by depth referred to by the microcomputer in the preferred embodiment.

Appendix IX is a memory map of the video memory employed in the preferred embodiment.

Appendix X is a psuedocode listing of the main program executed by the microcomputer in the preferred embodiment.

Appendix XI is a pseudocode listing of the interrrupt handling routine executed by the microcomputer in the preferred embodiment.

Appendices XII through XXII are pseudocode listings of the various program modules referred to in the pseudocode main listing of Appendix X.

DETAILED DESCRIPTION OF THE DISCLOSED EMBODIMENTS

Figure 1:
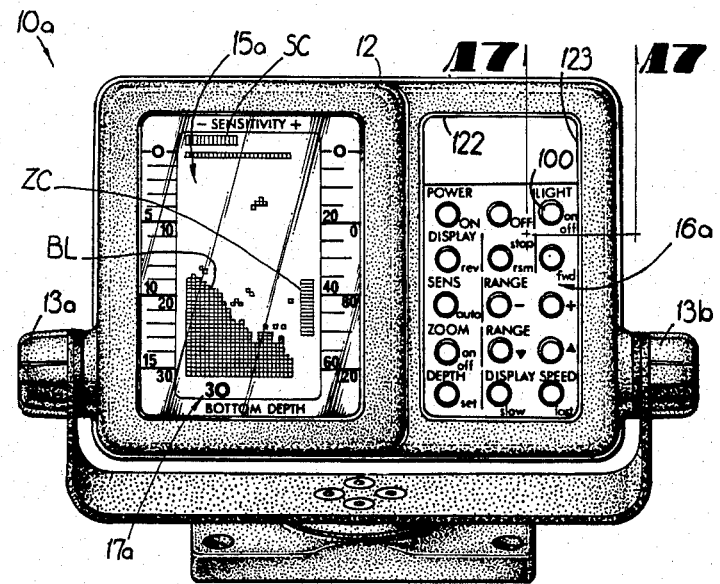
FIG. 1 is a front plan view of a preferred embodiment of the improved sonar depth sounder apparatus of the present invention.

Turning now to the drawings, in which like numerals indicate like elements throughout the several views, in FIG. 1 there is illustrated a depth sounder apparatus 10a constructed in accordance with the preferred embodiment. The preferred embodiment comprises a main housing 12 which is supported on swivel mounts 13a, 13b. A liquid crystal (LCD) display area or screen 15a L *is provided for display of target information obtained during operation.*

The display screen 15a is operative to simultaneously display a plurality of sonar returns resultant from a plurality of sonar pulse transmissions. As used herein, the term "sonar return" or "target return" means the results obtained from a transmission of high frequency sound pulses, typically displayed in a manner such as a line or "depth slice" wherein echoes received from the transmission are related to a predetermined depth scale. A switch panel 16a comprising an array of pushbutton switches allows operator selection and actuation of the various operable features of the depth sounder 10a.

In the embodiment illustrated in FIG. 1, the switch panel 16a includes a POWER ON and POWER OFF switch, a LIGHT switch, a DISPLAY REVERSE switch for selection of movement or scrolling of the display in reverse, a STOP/RESUME switch for freezing the display, a DISPLAY FORWARD switch for selecting movement of the display from the right to the left (normal), a SENSITIVITY AUTO switch for selection of the automatic sensitivity mode, a pair of RANGE switches (−) and (+) for incrementing or decrementing the sensitivity setting, a ZOOM ON/OFF switch for actuation of the zoom or range expansion feature, a pair of RANGE ("up" and "down" arrows) switches for moving the zoom cursor upwardly or downwardly, a DEPTH SET switch for selection of a depth range, and a pair of DISPLAY SPEED (FAST and SLOW) switches for increasing or decreasing the rate at which the display is scrolled. The operation of these various features will be described in greater detail below.

The display area 15a in FIG. 1 illustrates the result of selection of several various features. For example, a bottom line BL is illustrated as a solid darkened area; the blacked-in region below BL indicates that the apparatus in FIG. 1 has detected and "locked" onto the water body bottom, and has filled in the areas of the display beneath the detected bottom.

A zoom or cursor region ZC is illustrated as a vertical bar on the right hand portion of the display area 15a. This zoom region corresponds to a variably positionable predetermined range of depth which may be used to select a portion in the display area 15a for range expansion. The operation of the zoom or expansion feature will be described in more detail below.

A sensitivity cursor SC is illustrated as a horizontal bar across the top of the display area 15a. The length of the sensitivity cursor SC provides an indication as to the sensitivity setting of the receiver employed in the preferred embodiment, as described in greater detail below.

Also as illustrated in FIG. 1, the display area 15a is bordered on the left and right by depth scales. On the left hand side of the display area are scales extending from 0 to 15 feet and 0 to 30 feet, while on the right hand side are depth scales extending from 0 to 60 feet and 0 to 120 feet. The currently selected depth scale as indicated by a digital readout or "depth annunciator" 17 at the bottom of the display area 15a, for example, the 30 foot depth scale is indicated as having been selected in FIG. 1. Operation of these features will be described in greater detail below.

Figure 2:
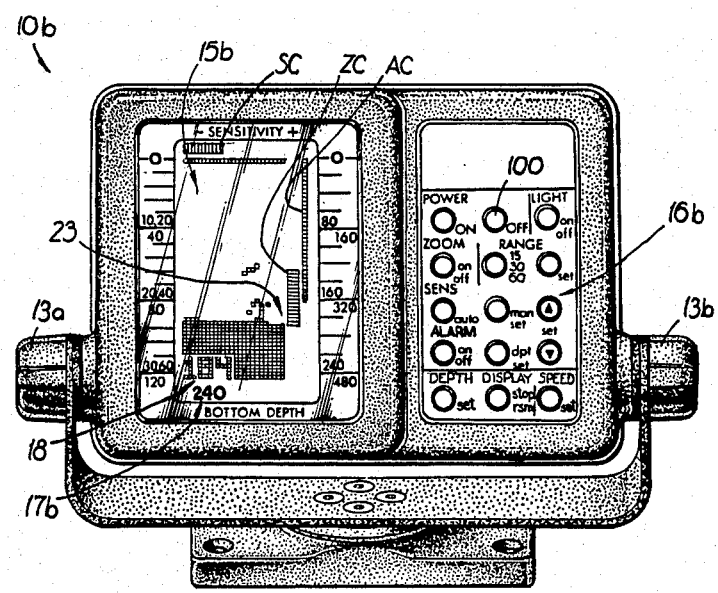
FIG. 2 is a front plan view of another embodiment of the present invention.

FIG. 2 illustrates a second embodiment 10b of a depth sounder apparatus constructed in accordance with the present invention. The depth sounder 10b in FIG. 2 includes a digital depth readout area 18 for providing a numerical readout of the bottom line BL of the most recent sonar return. The most recent return, immediately beneath the transducer, always is displayed at the rightmost position 23 of the screen. In addition, it may be observed that there are five depth scales in the embodiment of FIG. 2: 30 feet, 60 feet, 120 feet, 240 feet, and 480 feet. It will therefore be understood that the selection and arrangement of the depth scales in the present invention is arbitrary and may be chosen for convenience of the operator.

The depth sounder 10b of FIG. 2 further includes an alarm line or cursor AC which extends as a vertical bar from the 0 foot depth line to a selectable predetermined depth. For example, in FIG. 2 the alarm line AC is shown extending to about 160 feet, since the 240 foot depth scale is indicated as selected with annunciator 17b. Targets which are detected within the depth indicated by the alarm cursor AC trigger an audible alarm to alert the operator. Thus, the dept sounder 10b includes in switch panel 16b a switch for actuating the alarm, designated as ALARM ON/OFF, a DEPTH SET selection switch, and a pair of SET switches ("up" and "down" arrows) for raising or lowering the depth of the end point of the alarm cursor AC. Operation of the alarm feature will be described in greater detail below.

Figure 3:
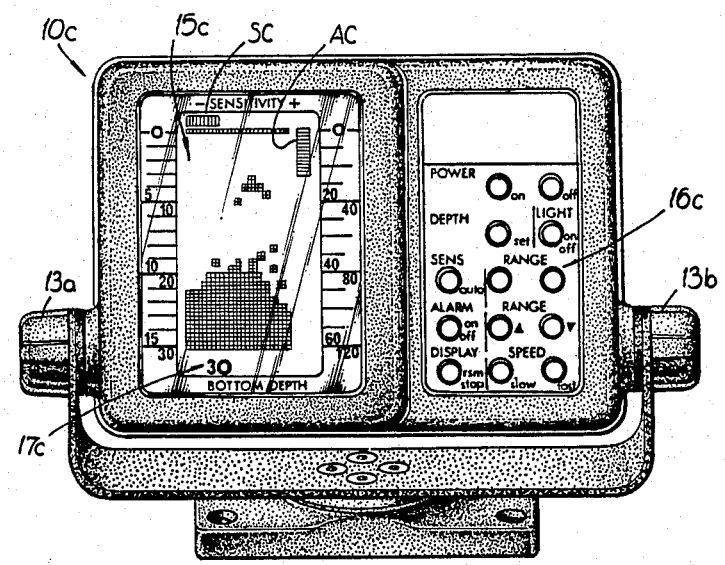
FIG. 3 is a front plan view of a third embodiment of the present invention.

FIG. 3 illustrates yet a third embodiment of a depth sounder apparatus 10c constructed in accordance with the present invention. This version includes an alarm cursor AC, but does not include the zoom or expansion feature. In addition, targets in the embodiments of FIGS. 3 and 4 are displayed at a resolution of four pixels, as opposed to a one pixel resolution as in FIGS. 1 and 2.

Figure 4:
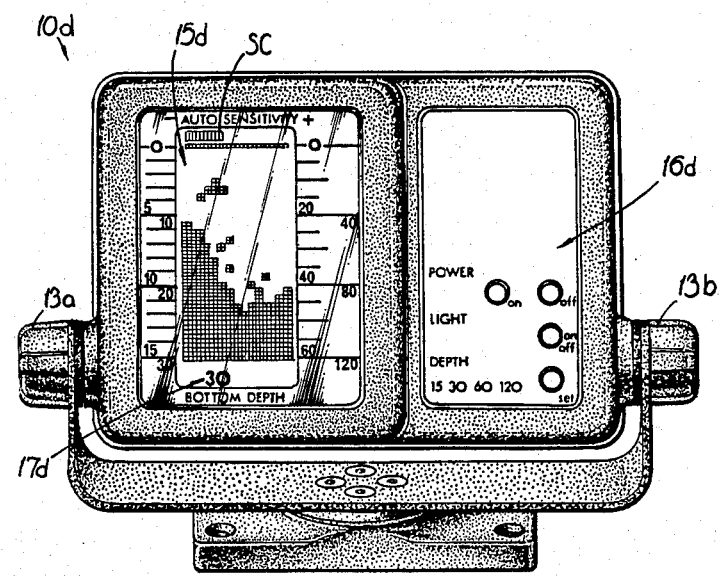
FIG. 4 is a front plan view of a fourth embodiment of the present invention.

A fourth embodiment 10d is illustrated in FIG. 4, and includes automatic bottom detection and fill-in, and automatic depth selection, but does not include a selectively variable sensitivity, zoom, alarm, or some of the other featurs of the other illustrated embodiments. It will therefore be understood that various operational characteristics of the preferred embodiments may be combined in a variety of manners, while still falling within the scope of the present invention.

OPERATION OF THE DISCLOSED EMBODIMENTS

First will be described the operation of the disclosed embodiments of the present invention, shown in FIGS. 1-4. All of the disclosed embodiments are capable of automatic operation; the depth sounder 10d in FIG. 4 is completely automatic, while the remainder of the disclosed embodiments are selectively automatic. When activated and in the automatic mode, the depth sounder apparatus will find the bottom, adjust for the proper amount of sensitivity, and advance to the proper depth range automatically to display bottom, fish and other underwater objects.

Figure 10:
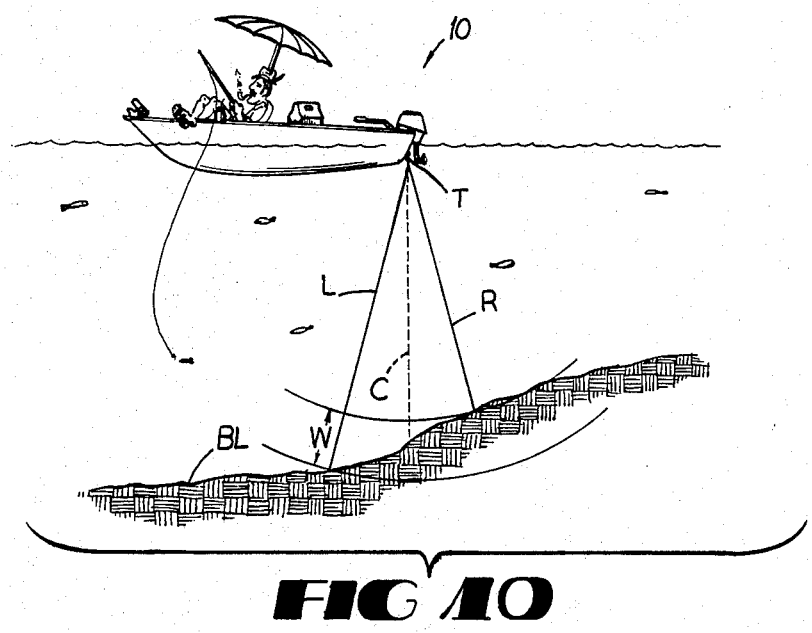
FIG. 10 ilustrates the effective beam pattern of the sonar transducer employed in the preferred embodiment.

In each of the disclosed embodiments, a transducer must be mounted to transmit ultrasonic pulses downwardly of the boat such as is illustrated in FIG. 10. Power is connected to the apparatus from a 12 volt power souce, such as from a boat battery. In addition, the transducer must be mounted for unabstructed transmission of the ultrasonic pulses, and a cable connected between the transducer and the depth sounder apparatus.

To activate the disclosed embodiments, a user depresses the power ON switch. The apparatus always activates in the automatic mode. In the automatic mode, the device will find the bottom by varying the sensitivity and selecting the proper depth range for a satisfactory return. Also, the display below the bottom line BL is blacked out to make the display easier to read.

In the automatic mode, the proper depth range is found as soon as the apparatus is turned on. As the apparatus is moved into deeper water and the bottom goes off the screen, the next deeper depth range will automatically be activated. In order to return to a shallow depth range, a user must manually depress the depth SET button; in the embodiment of FIG. 1 and FIG. 2, however, a shallower depth scale is automatically selected. Each time the depth SET button is depressed, the range is decreased by one setting. Thus, this control works in the opposite direction from the automatic depth advance. In the event the user attempts to change to a depth scale which is less than the actual bottom depth, the control computer will automatically change the depth scale back to the proper depth. For example, if the user is in forty feet of water and changes the depth scale to thirty feet, the computer will automatically change back to the sixty foot scale.

In the "manual" mode, the automatic range or scale change is not operative. This means that a user must manually set the depth scale. For example, if a user is on the 0–30' scale and the bottom goes from twenty-five to thirty-five feet, the user would press the depth set button three times to go from 0–30' scale, the 0–15', the 0–120', and then the 0–60' scale. The bottom would then be displayed at thirty-five feet.

The depth scale or range is always displayed at the bottom of the disclosed embodiments. The graduated depth scales down the left and right side of the display area 15 identify the proper depth based on the range presently active at the time. Accordingly, on the 0–15' scale, each line represents a one foot increment. On the 0–30' scale, a two foot increment; on the 0–60' scale, a five foot increment; and on the 0–120' scale, a ten foot increment.

Because of the operation of the automatic screen reformatting feature (FIG. 1 and FIG. 2 only), information is automatically being stored in memory in smaller increments than is being displayed on the normal depth scales. For example, even though a user may have initially selected the 0–120' scale, when a change is made to the 0–15' scale, the information will be displayed as if the user had been on the 0–15' scale all along. Accordingly, no information or resolution is lost.

The light ON/OFF switch activates the display light for night or low light conditions. The light is turned off by again depressing the ON/OFF switch.

The sensitivity of the disclosed embodiments operates as follows. In the automatic mode, each time the unit is turned on, the automatic mode is operative and the sensitivity is adjusted automatically to give a "good" return and select the correct depth range. The annunciator word AUTO will appear in the upper right hand corner of the embodiments of FIGS. 1-3 (see FIGS. 13-16). The sensitivity cursor or bar SC at the top of the screen will increase or decrease automatically indicating the amount of sensitivity selected by the computer. In deeper water or soft bottom conditions this bar will increase to the right, indicating more sensitivity. In shallow water or when a hard bottom is detected, the sensitivity needed to achieve a good return will be less. Also in the automatic mode, the apparatus will black out the display beneath the bottom line BL.

In the manual mode, sensitivity operates as follows. A user must deactivate the automatic mode by depressing the SENS AUTO button or by depressing the manual RANGE decrease (−) or increase (+) button (the MAN SET button followed by the up-arrow or down-arrow in the embodiment of FIG. 2). The annunciator word AUTO in the right hand quarter disappears. The operator can then control the amount of sensitivity by depressing the (−) or (+) button (or the up-arrow or down-arrow in the embodiment of FIG. 2). In embodiments with a sensitivity control SENS, there are fifteen sensitivity settings. When the (+) or (−) button is pressed once, the sensitivity setting at the top of the screen will change by one division. If the (+) or (−) button is held down, the setting will move up or down as long as the button is held. When the maximum or minimum setting is achieved, the apparatus will make a "chirping" sound to indicate that a limit has been reached.

Figure 11:
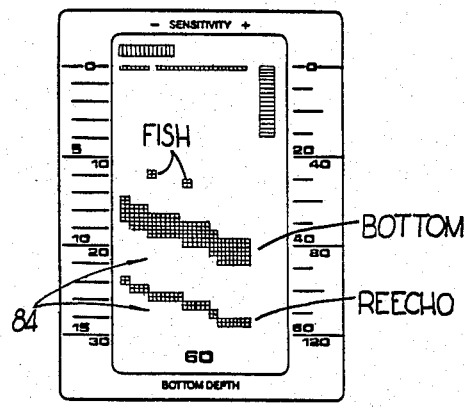
FIG. 11 is an exemplary display screen produced by the preferred embodiment of FIG. 5, illustrating a typical bottom return.

In the manual mode, everything below the bottom BL is no longer blacked out, therefore a second return or double echo can be displayed if desired (e.g., see FIG. 11). Also, the hardness of the bottom can sometimes be determined by the thickness of the bottom return. For example, a hard or rock bottom may produce a wider bottom return as compared to a soft or muddy bottom.

The manual sensitivity control is useful when looking for smaller targets such as smaller fish. In the automatic mode, the computer may not be using enough sensitivity to show smaller targets. At higher sensitivity settings more targets will be seen. Therefore, the operator might want to use the automatic mode while running in the water, and use the manual mode for charting and finding fish.

It should also be noted that it is possible to have the sensitivity set too high such that reflections from suspended matter, thermoclines, or air bubbles will begin to black out the display. In the manual mode, the detpth scale does not change automatically. To again activate the automatic mode, the user depresses the SENS AUTO switch.

The display includes a stop/resume feature in the embodiments shown in FIGS. 1–3. Any time during the operation of the apparatus, the operator may "freeze" the display by pushing the STOP/RSM button. This aids in the learning and interpretation of the signals on the display by giving the operator time to study the display. The STOP/RSM switch will not change any original settings when once again activated. Functions such as zoom, the depth scales, reverse and forward remain active with the display stopped. When the STOP/RSM button is pressed again, the apparatus will resume reading at the immediate point at which the boat is sitting in the water.

Information that has gone off the display screen can be reversed back onto the screen by using the display reverse feature in the embodiment of FIG. 1. By pressing the DISPLAY REV button information that has gone off the left side of the display can be seen again, that is, the display will begin to shift to the right. When the REV is pressed once, the display will move one division or increment. If the button is held down, the display will move to the right as long as the button is held. Up to one full screen may be redisplayed. Once a full screen has been reached, a "chirping" sound will indicate that the limit has been reached.

The display forward button FD moves or shifts the display to the left, the normal direction. Thus, the FD button shifts the information in the opposite direction than does the REV button. To begin transmitting and receiving new information after using REF or FD, the STOP/RSM button is pressed. The display will then change back to the location seen before reversing, and the apparatus will resume reading at the immediate point at which the boat is sitting.

In the embodiments of FIGS. 1 and 2, the "zoom" or display expansion feature allows a look at underwater readings in fine detail, providing the capability to "zoom in" on bottom, fish, and underwater objects, even after an area has been passed over. The ZOOM/RANGE switches control the zoom feature. The RANGE (up-arrow) or RANGE (down-arrow) buttons cause the zoom region to move up or down one increment. If the button is held down the region will continue to move as long as the button is held. The zoom region or cursor ZC is indicated by the group of bars at the extreme right of the display, indicated as ZC in the embodiments of FIGS. 1 and 2. In the embodiment of FIG. 1, this region represents seven and one half feet on the 0–15′ foot and 0–30′ foot scales, and fifteen feet on the 0–60′ and 0–120′ scales. Thus, when zooming in on the 0–15′ or 0–30′ foot scales, each dot on the display represents one and one half inches, and on the 0–60′ or 0–120′ scale, each represents three inches.

In order to use the zoom or expansion feature, the operator first positions the zoom region or cursor next to the area that is desired to be expanded by pressing the RANGE (up-arrow) or RANGE (down-arrow) buttons. Next, the operator presses the ZOOM ON/OFF button to activate the zoom or expansion. The annunciator "Z" appears in the lower right hand corner of the display, indicating that the zoom feature has been selected (see FIG. 14). The entire screen then quickly changes to show an expanded view of the area from the top of the zoom cursor to the bottom of the zoom cursor. The display screen reformatting or updating feature allows the operator to zoom in on an area even after it has been passed over, by moving the display forward or reverse.

The zoom feature may be activated at any time during normal transmitting and receiving, stopping the display, or reversing. By pressing the ZOOM ON/OFF button again, the operator can go back to the unexpanded or "normal" display.

Figure 13:
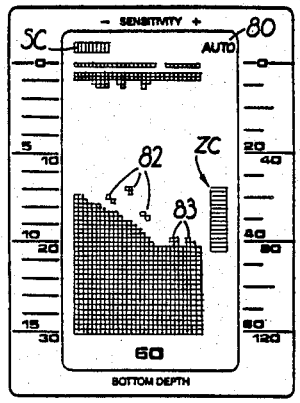
FIG. 13 is an exemplary display screen produced by the preferred embodiment of FIG. 5, illustrating bottom fill.
Figure 14:
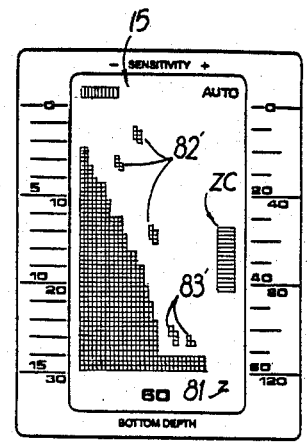
FIG. 14 is an exemplary display screen illustrating zoom or expansion of the zoom region shown in FIG. 13.

Additionally, while the zoom feature is actuated, the user can move the RANGE (up-arrow) or RANGE (down-arrow) to move through a depth in fine detail. The zoom cursor ZC on the right of the display remains in a fixed position on the display even in the zoom mode to be used as a depth reference. For example, and as shown in FIGS. 13 and 14, the zoom range is set between 27′ and 42′. This means that when the zoom is activated, the operator is looking at an expanded view of the area between 27′ in depth and 42′ in depth.

All of the disclosed embodiments (except FIG. 4) provide several different display speeds for convenience to the operator. When the apparatus is turned on, the display will advance at a medium speed. To increase the display speed, the operator depresses the FAST button or holds it down to increase the speed rapidly. An audible sound is heard each time the speed is advanced. When the limit has been reached, a "chirping" sound will be heard. At this point the speed of the display will be advancing at its maximum. To decrease the speed, the operator depresses the SLOW button until the desired display advance rate is reached. It is generally preferable to select a faster display speed for high speed operation, but to use a slower display speed for idle or trolling speed.

The display screen updating or reformatting feature operates automatically in the embodiments of FIG. 1 and FIG. 2 to totally change or update the screen to a new depth scale when the depth scale changes. The disclosed embodiments incorporate memory devices which store approximately 32K bits of information. Automatically during operation, the control computer stores information into the memory; the stored information comprises all data from 0-120' of depth (for the embodiment of FIG. 1, two entire screens, and 480' for the embodiment of FIG. 2, one screen). All information is being stored regardless of the selected depth scale for the display. In addition, the data is stored in memory in smaller increments than may be displayed. For example, on the 0-60' depth scale each dot represents one foot of depth, but the computer is storing information in memory at a resolution wherein each dot equals three inches.

Figure 15:
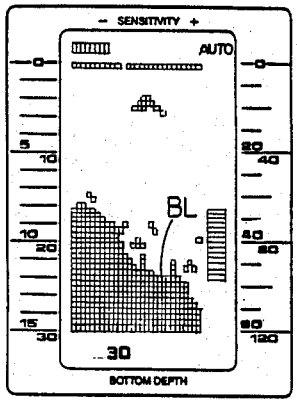
FIG. 15 is an exemplary display screen produced by the preferred embodiment of FIG. 5, illustrating the 30 foot display scale.
Figure 16:
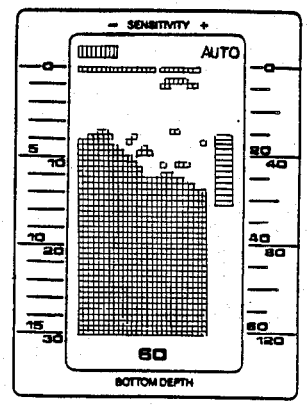
FIG. 16 illustrates the information displayed in FIG. 15 at the 60 foot display scale.

The display screen reformatting feature operates to automatically change or update the entire screen to a new depth scale when a depth scale is changed. This display screen reformatting works when changing to deeper or shallower scales. The display screen reformatting feature is illustrated in FIGS. 15 and 16, in response to a change from the 0-30' scale to the 0-60' scale.

The display screen reformatting also allows the operator to reverse or bring back onto the display up to one full screen of past information in the embodiment of FIG. 1. In effect, this doubles the size of the display screen.

The display screen reformatting is also operative in the zoom or expansion mode. Since the computer has stored in memory information for the operable depth limits of the device in small increments, the operator is able to recall this information from memory to obtain an expanded view of areas which have already been passed over. For example, if the operator passes over an interesting bottom structure or fish, the operator would be able to zoom in for a closer look without going back over the same area by activating the zoom, and the information that is stored in memory will be recalled and displayed on the screen.

PREFERRED CIRCUITRY AND STRUCTURE

Attention will now be turned to describing the operation and function of the disclosed embodiments illustrated in FIGS. 1 through 4, with a discussion as to operation of the various functional features. Those skilled in the art will understand after the discussion which follows how the various features may be employed singularly or in combination to accomplish the objectives hereinabove described.

Figure 5:
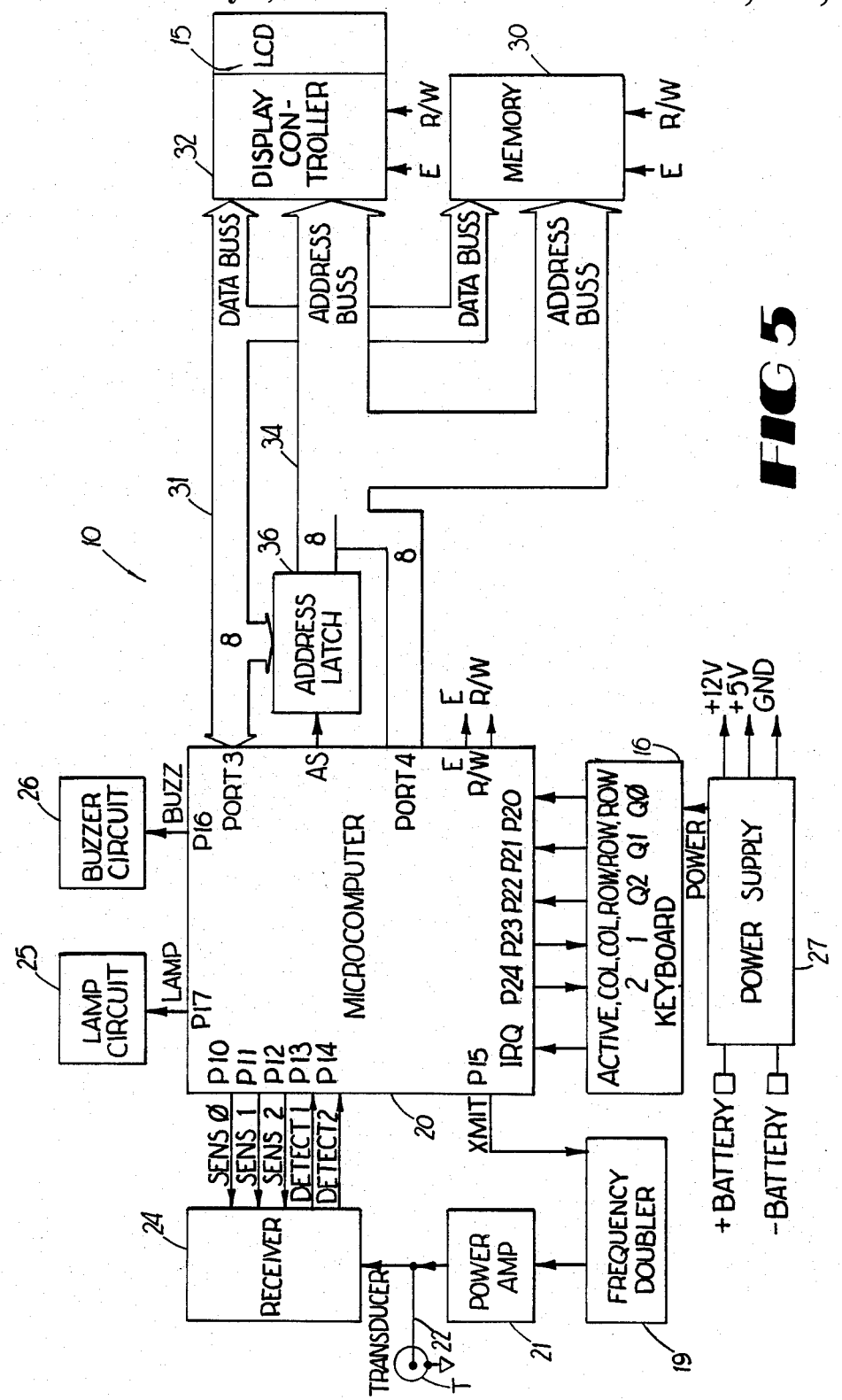
FIG. 5 is a general block diagram of the preferred embodiment of the improved sonar depth sounding apparatus constructed according to the present invention.

Turning now in particular to FIG. 5, the preferred embodiment of the circuitry employed in the depth sounder 10 in the preferred embodiment will be described in greater detail. The depth sounder 10 is constructed around a microcomputer 20, which is programmed to control the generation of sound pulses, select an appropriate sensitivity setting, receive and process signals corresponding to reflected or echoed sound pulses, store data corresponding to target sonar returns in a memory, format the target return data for display, and respond to actuation of the keyboard for selection of various functions. A frequency doubler 19 receives a transmit (XMIT) signal from the microcomputer 20, and is responsive to provide 200 kHz sound pulses to a power amplifier 21, which in turn are provided on line 22, to a transducer T. Transducer T in the preferred embodiment is a two-inch barium titanate piezoelectric transducer. The construction and operation of frequency doublers, power amplifiers and sonar transducers will be known to those skilled in the art, and will not be described further herein.

Reflected or echoed sound pulses are received by the transducer T and provided back along line 22 to a receiver circuit 24. The microcomputer 20 selects one of eight possible receiver sensitivity settings on lines SENS0, SENS1, SENS2 for two detector stages in the receiver, so that incoming signals may be processed at one of sixteen possible sensitivity settings. The microcomputer 20 reads either the inputs signal DETECT1 or DETECT2 from the receiver 24. As will be described in greater detail in connection with FIG. 9, the microcomputer reads one of the two different detector stages, each having a different range of sensitivities.

A lamp circuit 25 is provided for illuminating the display screen 15 in low ambient light conditions. In the preferred embodiment, the display is a liquid crystal display which operates best in high ambient light.

A buzzer circuit is also connected to the microcomputer 20, and provides an audible signal to the operator in various circumstances.

The keyboard or switch panel 16 is connected to a series of input/output lines 29 of the microcomputer 20. The microcomputer 20 is responsive to an interrupt request (IRQ) generated by the keyboard circuit 16 to scan COL1 and COL2 and read the signals from the keyboard, denominated ROW Q0, ROW Q1, and ROW Q2, to determine which of a plurality of switches have been depressed.

A conventional power supply 27 provides power for operation of the circuitry in the known manner.

A memory 30 is provided for storage of the program for the microcomputer 20, for storage of target data prior to formatting for display, and for storage of data which has been formatted for display on the display 15. An eight-bit data bus 31 is connected to one of the ports of the microcomputer 20, PORT 3, and provides eight bits of data to a display controller 32 which controls the display 15, and to the memory 30.

Microcomputer 20 generates sixteen bits of address information on an address bus 34 for purposes of addressing the memory 30 and the display controller 32. The eight most significant bits of address information are provided from PORT 4 of the microcomputer 20, while the eight least significant bits are provided from the outputs of an address latch 36, the inputs of which are connected to the data bus 31, and latched into the address latch 36 by an address strobe (AS) signal from the microcomputer.

Figure 6:
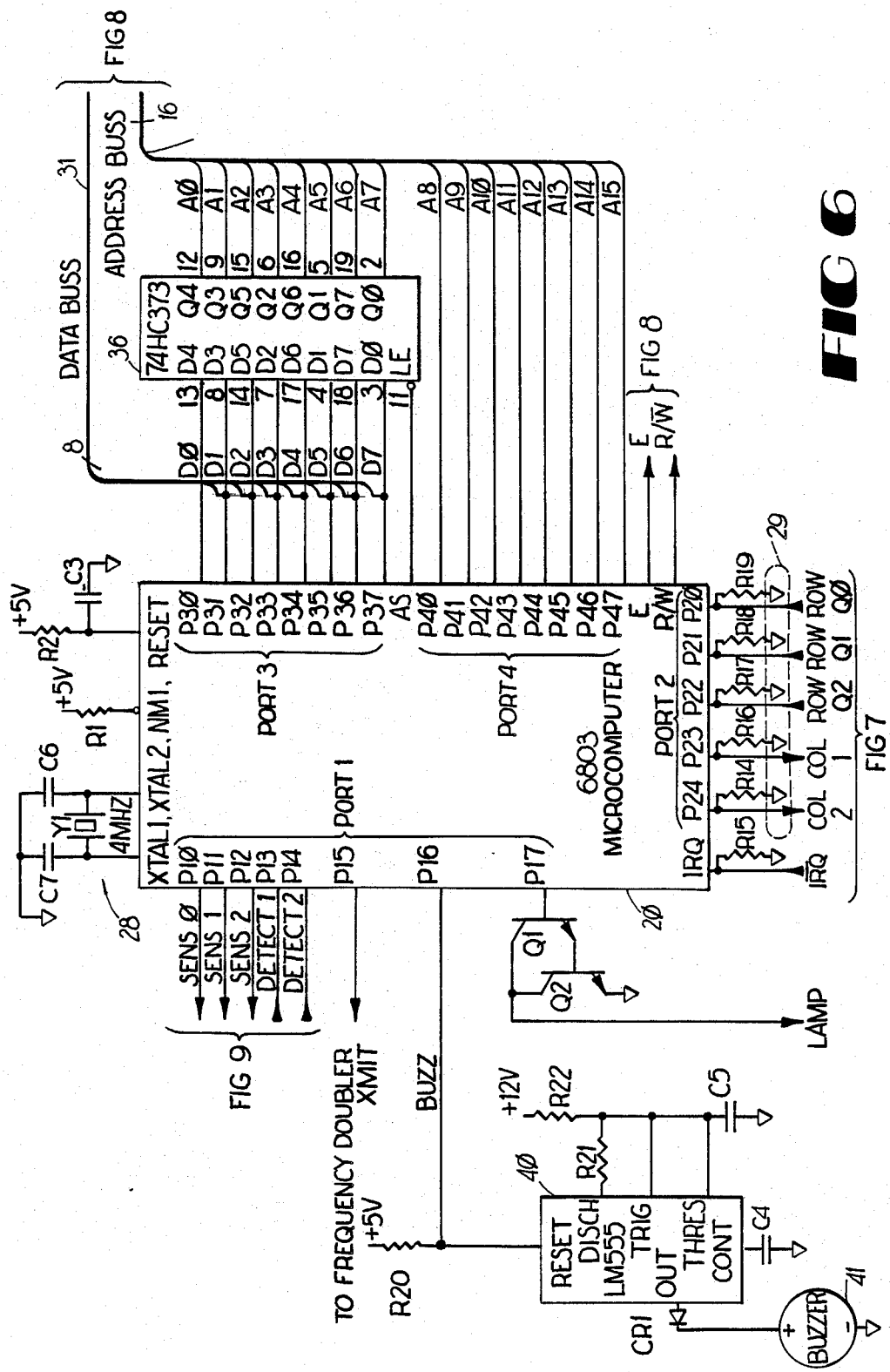
FIG. 6 is a detailed schematic diagram of the microcomputer and associated circuitry employed in the preferred embodiment illustrated in FIG. 5.

FIG. 6 illustrates in detail the circuitry employed in the preferred embodiment associated with the microcomputer 20. In the preferred embodiment, microcomputer 20 is a type MC 6803 eight-bit microprocessing unit manufactured by Motorola, Inc., Microprocessor Division, of Austin, Tex. The preferred 6803 microcomputer includes four input/output ports, PORT 1–PORT 4, which are configured to provide an eight-bit bidirectional data bus, a sixteen bit address bus, and other peripheral input/output lines. Details of the operation and internal structure of the 6803 are available in the literature provided by the manufacturer.

The 6803 is clocked by a crystal circuit 28 at 4 MHz to produce a 1 MHz clock rate connected to the crystal inputs XTALI1 and XTAL2; accordingly, the frequency doubler 19 in FIG. 5 is required to up-convert 100 kHz pulses, which are easily generated in the 6803, to the preferred 200 kHz. In the preferred embodiment, a 200 microsecond burst of 100 kHz pulses (i.e. 20 pulses) are provided as the XMIT signal, and doubled to 200 kHz.

One of the PORT 1 lines, P17, is connected to the base of a pair of Darlington-connected transistors Q1, Q2, the common collectors of which provide a signal denominated LAMP for illuminating the display light. Operation of such lamp driver circuits will be known to those skilled in the art will not be described further herein.

Another of the PORT 1 output lines P16 is the signal BUZZ, which is provided to the RESET input of timer circuit 40. In the preferred embodiment, a type LM555 manufactured by National Semiconductor Corporation of Santa Clara, Calif. is employed as a free-running multivibrator. The output OUT of timer circuit 40 is provided through diode CR1 to a buzzer 41 so that an audible output signal for the operator may be provided. The timing components R21, R22 and C5 for the timer 40 are connected in a manner which will be known to those skilled in the art for a generation of an audio frequency sound. Those skilled in the art will understand that microcomputer 20 can cause the timer 40 to provide a variety of sounds by controlling the "ON" time of the timer with the BUZZ signal. In a preferred embodiment, a very brief "tick" sound (about 0.004 seconds) is provided to indicate an increment of sensitivity setting, range setting, and the like, while a longer duration sound is provided to signify an alarm condition or to signify that a selectable limit has been reached.

The PORT 2 output port of microcomputer 20, together with the interrupt request input IRQ, are employed for determining keyboard actuation. The interrupt request line IRQ receives an interrupt request from circuitry illustrated in FIG. 7, which occurs upon the depression of a switch on the switch panel 16.

Figure 7:
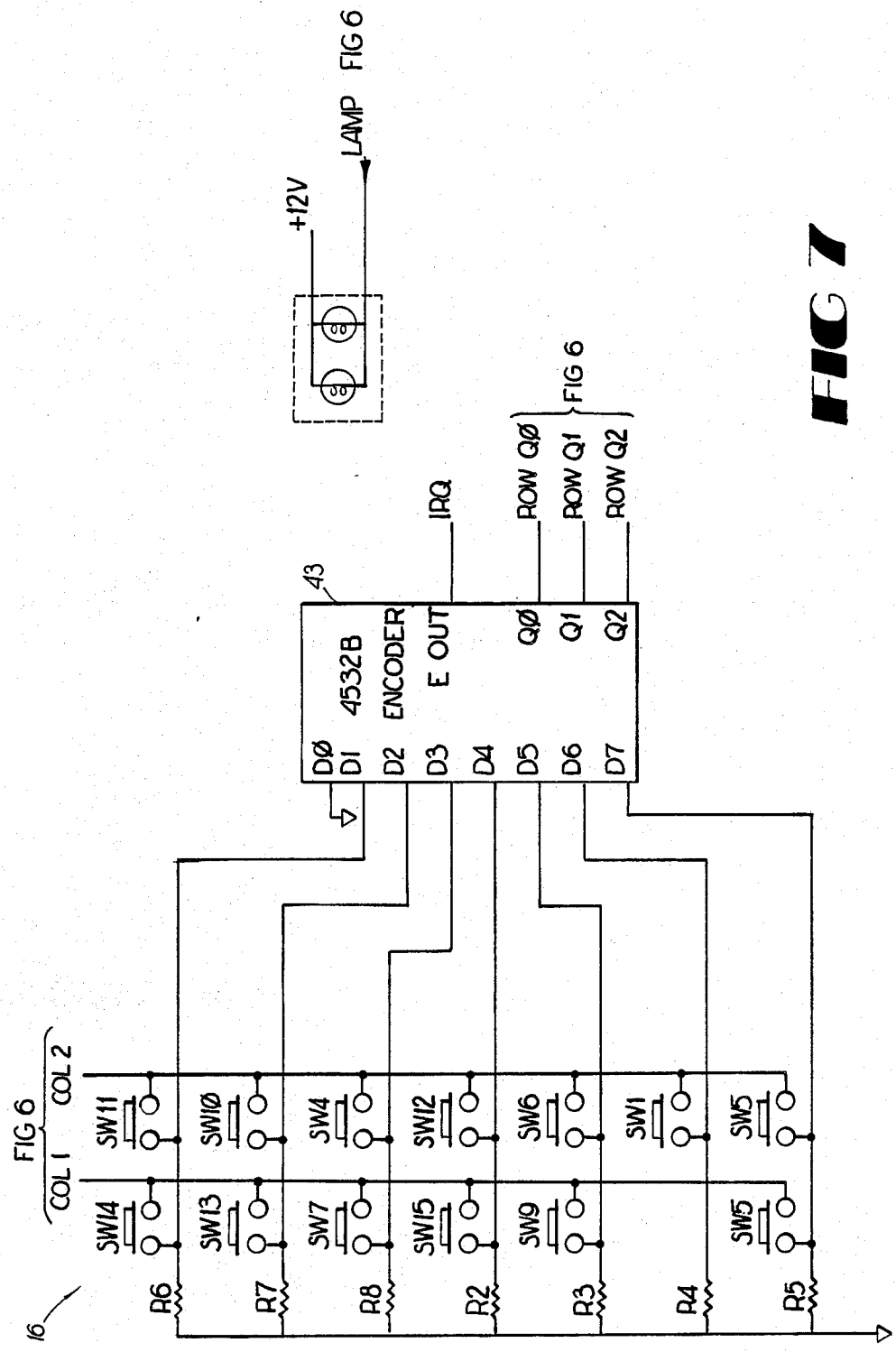
FIG. 7 is a detailed schematic diagram of the operator control panel switch circuitry employed in the preferred embodiment illustrated in FIG. 5.

As illustrated in FIG. 7, the switches of the switch panel 16 in the preferred embodiment are configured in an array of two columns and seven rows. The assignment of a particular one of the switches SW1-SW15 to one of the switch functions described in connection with FIGS. 1-4 is arbitrary and identification is handled through the software. The microcomputer 20 determines which of the keys has been depressed by selecting one of the two rows with the column selection signals COL1 or COL2. Voltage sourced from the selected column line COL1 and COL2 passes through the closed contacts of a depressed switch to cause a "1" to appear on one of the seven input lines to a eight-bit priority encoder 43. The priority encoder in the preferred embodiment is a type CD4532B CMOS eight-bit priority encoder manufactured by RCA Corporation of Somerville, N.J. Encoder 43 provides a three-bit binary code on outputs Q0, Q1, Q2 denominated as signal ROWQ0, ROWQ1, and ROWQ2, respectively, which indicate which of the switches in a selected column of the switch panel 16 have been depressed.

When a switch is depressed, the interrupt request signal IRQ is provided from the EOUT output of the encoder 43 and signals the microcomputer 20 that one of the switches has been depressed. The EOUT signal will be provided when ay one input to the encoder 43 is high. As will be understood by those skilled in the art, microcomputer 20 scans the two columns of switches by alternately enabling the lines COL1 and COL2.

Figure 8:
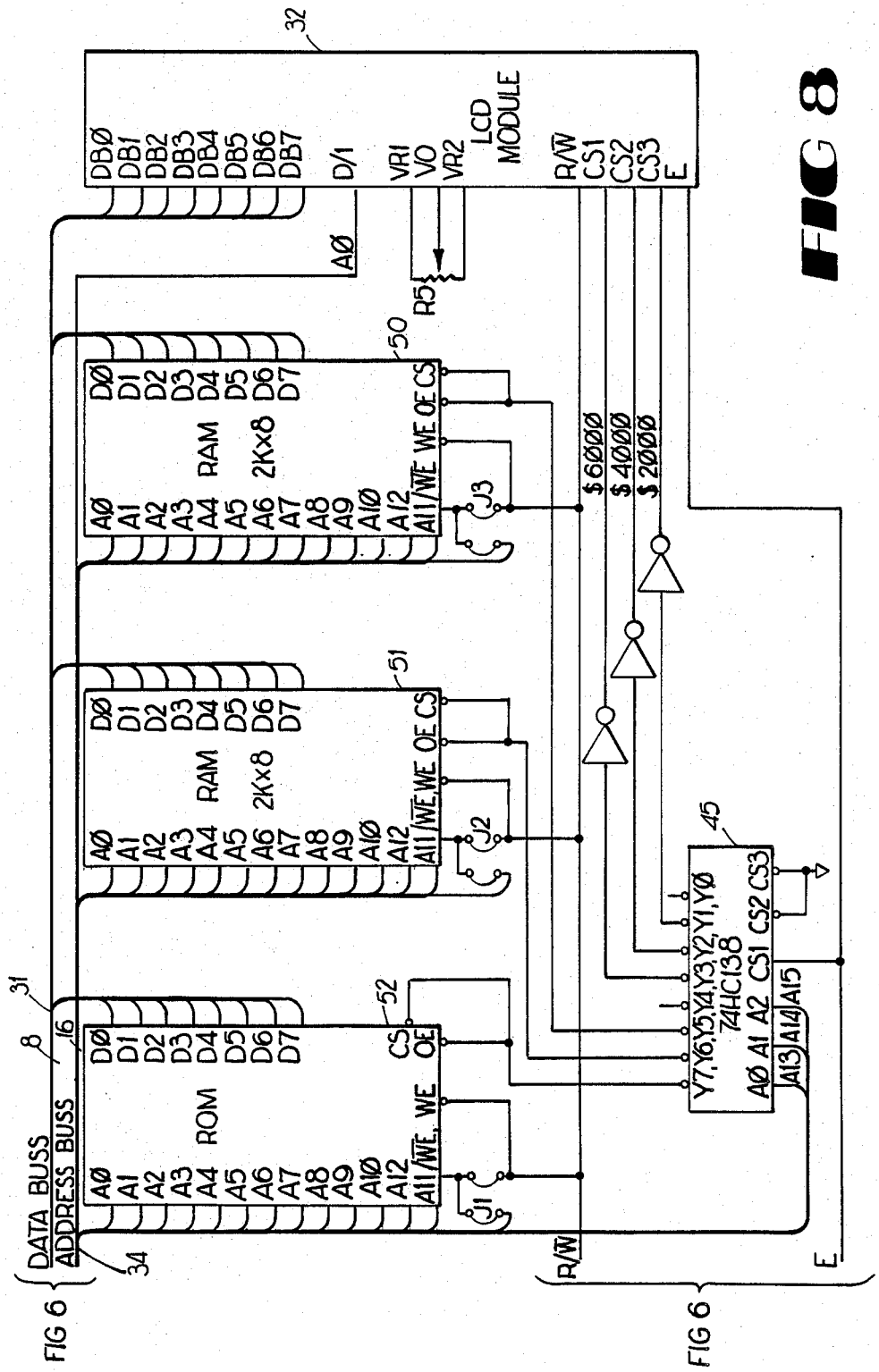
FIG. 8 is a detailed schematic diagram of the memory and display circuitry employed in the preferred embodiment illustrated in FIG. 5.

Returning now to FIG. 6, microcomputer 20 provides memory control signals denominated E (enable) and READ/WRITE (R/W) to the memory circuitry 30 in FIG. 8. The E signal is an output clock used primarily for bus synchronization, while the R/W signal indicates whether a memory read or memory write operation is to be performed.

An address strobe (AS) signal is provided to a latch circuit 36 to strobe eight least-significant bits of address data contained on the data bus 31 (from PORT3 of the microcomputer) into the latch. In the preferred embodiment, latch 36 is a type 74HC373 high speed CMOS latch manufactured by RCA. As described in connection with FIG. 5, microcomputer 20 has a sixteen bit address bus, formed by lines A0-A15; address lines A8-A15 are directly provided from PORT4, while lines A0-A7 are provided from the outputs of latch 36.

FIG. 8 illustrates the memory circuitry 30 employed in the preferred embodiment, and the liquid crystal display (LCD) module 32. The LCD module 32 includes the display screen 15 and display control circuitry for driving the display.

All of the circuitry illustrated in FIG. 8 are peripherals of the microcomputer 20, and as such, may be separately addressed. Accordingly, an address decoder circuit 45 receives the three most significant address bits A13, A14, A15 of the address bus 34, and selects one of three different memory circuits or one of three different addressable circuits contained within the display controller 32. In the preferred embodiment, address decoder 45 is a type 74HC138 high speed CMOS manufactured by RCA. The enable input (E) from the microcomputer is connected to one of the chip select (CS1) inputs of address decoder 45, and is also connected to the enable (E) input of the display controller 32.

The outputs Y1-Y3 and Y5-Y7 of decoder 45 select a particular peripheral component. As may be seen in FIG. 8, hexadecimal address A000 selects a random access memory (RAM) circuit 50, address C000 selects a RAM circuit 51, address E000 selects a read/only memory (ROM) circuit 52, while addresses 2000, 4000 and 6000 are connected to respective chip select (CS) inputs of the address controller 32 for selecting one of three different circuits contained within the display controller. The CS inputs of the display module CS1, CS2, and CS3 are discussed in more detail in connection with Appendix II.

The RAM's 50, 51 store target data and data which has been formatted for display. In the preferred embodiment, memories 50, 51 are 2K×8 static MOS memories such as a type HM6116 AP20 manufactured by Hitachi America, Ltd. of San Jose, Calif. The output enable (OE) and chip select (CS) inputs of the memories 50, 51 are connected to the appropriate address select line from the address decoder 45. The READ/WRITE (R/W) control line from the microcomputer is connected to the write enable (WE) inputs of the memories in the manner known to those skilled in the art. It will thus be appreciated that the microcomputer 20, with the memories as illustrated, is able to store four kilobytes of data corresponding to target returns and to data to be displayed. It will also be appreciated that the memory capacity can be increased by employing larger memories.

ROM 52 is employed for program storage in the preferred embodiment. The preferred program storage ROM 52 is a type AMI 2333 4K×8 manufactured by American Microsystems, Inc. of Santa Clara, Calif.

The preferred liquid crystal display (LCD) module 32 employed in the preferred embodiment is a custom unitary pixel-addressable matrix LCD module manufactured by Hitachi America, Electron Tube Division of Chicago, Ill. The LCD display in the embodiments illustrated in FIGS. 1 and 2 is a 30×60 pixel matrix for display of target information, plus addressable pixels for cursors, annunciators, and the like shown in FIGS. 1-4.

In the embodiments illustrated in FIGS. 3 and 4, the matrix is also nominally 30×60 pixels, but is internally configured as 15×30, a lower resolution, for cost savings. Those skilled in the art will appreciate that a cost savings may be realized by electrically connecting alternate rows and columns in the display to eliminate half of the driver circuits for the LCD matrix. However, and as may be seen in a comparison of FIGS. 3 and 4 versus FIGS. 1 and 2, the minimum target size for the embodiments of FIGS. 1 and 2 is one pixel but is four pixels arranged in a square in the embodiments of FIGS. 3 and 4.

Those skilled in the art will understand that predefined informational indicia or "annunciators" may be formed on a liquid crystal display by silk-screening an opaque portion on the glass covering the display. In the preferred embodiments of FIGS. 1 through 4, several annunciator regions provided for various purposes: display of a selected scale (15, 30, 60 or 120 feet for FIGS. 1, 3 and 4); a "Z" to indicate selection of the zoom mode (81 in FIG. 14); a series of bars extending vertically along the right hand portion of the display for display of the zoom cursor ZC and the alarm cursor AC; a series of bars extending horizontally along the upper portion of the display for displaying the sensitivity setting SC; and an annunciator AUTO to indicate that the automatic mode has been selected and is in operation (80 in FIG. 13). Those skilled in the art will understand and appreciate how to construct liquid crystal displays to include such annunciator features.

It should also be understood that the selected depth scale determines the resolution of information displayed, but that a predetermined resolution of information is stored in the memories. In the preferred embodiments disclosed herein, the minimum target resolution is three inches. Accordingly, for the entire 120 foot operable depth range, 4×120=480 bits are needed for each column of storage of target information to 120 feet (more, of course, for the 480 foot version of FIG. 2). However, when the 120 foot depth scale is selected, each pixel in a column of 60 pixels in the display represents two feet. When the zoom mode is selected, the zoom region, which is a variably positionable 15 foot region, expands the selected area to correspond to fifteen feet, such that each pixel then again represents three inches of resolution. Accordingly, a displayed target of one pixel on the 120 foot depth scale may represent a target varying in size from three inches to two feet; when the target is expanded in the zoom mode, the target can be viewed to a three inch resolution for more accurate size determination.

In addition, the embodiment of FIG. 2 includes a region 18 on the liquid crystal display module 32 for displaying a numerical digital readout of the depth.

Figure 9:
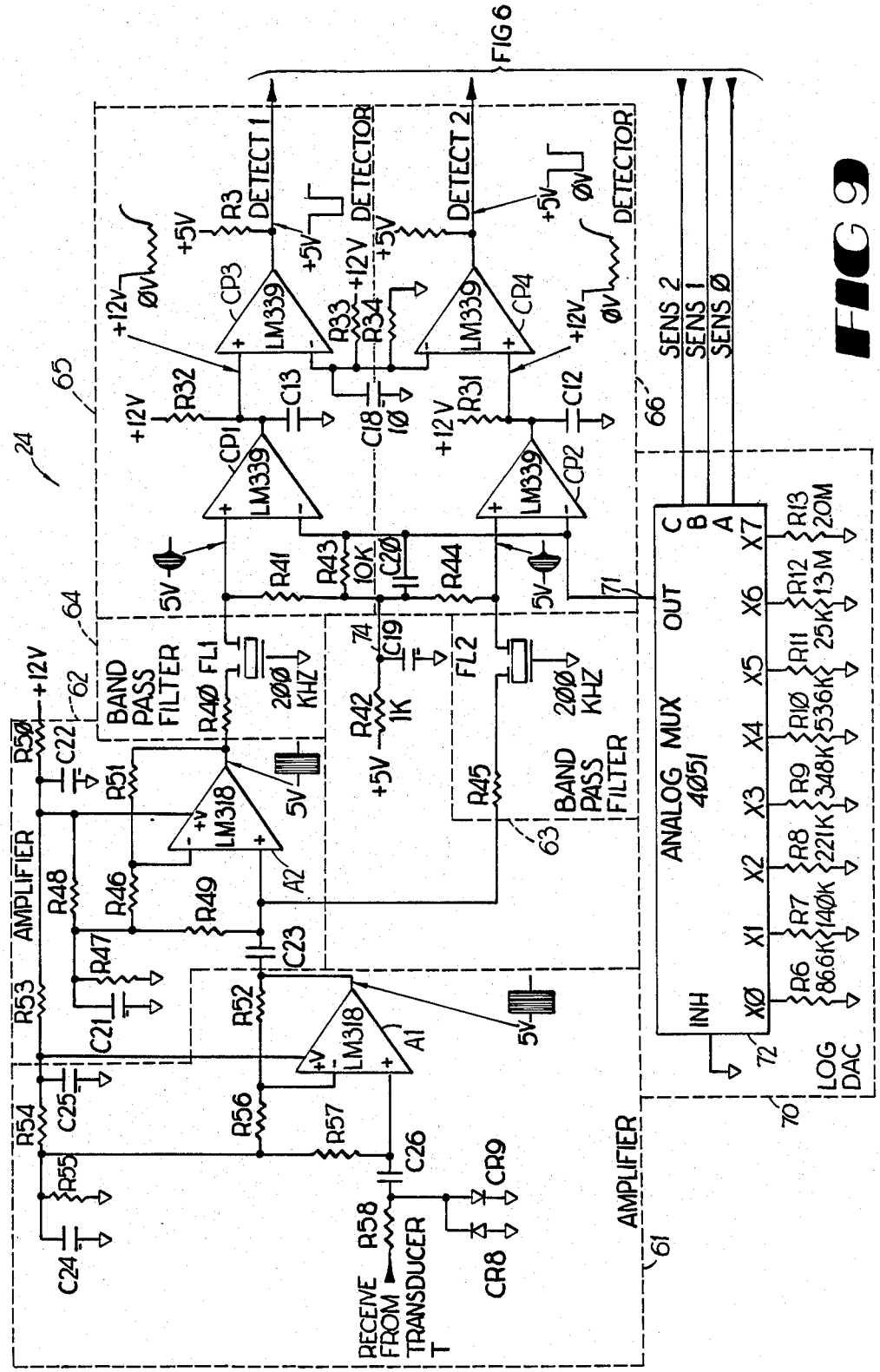
FIG. 9 is a detailed schematic diagram of the receiver circuitry including the variable sensitivity amplifier employed in the preferred embodiment illustrated in FIG. 5.

Turning now to FIG. 9, there will be discussed the structure and operation of the receiver circuit 24 which is generally illustrated in FIG. 5. It will be recalled from the discussion above that the receiver 24 is constructed to exhibit selectably variable sensitivity settings. The preferred variably sensitive receiver 24 comprises a first amplifier stage 61 which provides a predetermined 30 decibels (dB) of gain, and a cascaded second amplifier stage 62 which provides an additional 30 dB gain. The outputs of each of amplifier stages 61, 62 are filtered by 200 KHz band pass filters 63, 64, respectively, prior to being provided to a pair of detector stages 65, 66. Detector stages 65, 66 are responsive to detect signal levels above a selectable predetermined threshold provided by a logarithmic digital-to-analog (DAC) converter stage 70, which provides the variable levels of sensitivity.

Each of the amplifier stages 61, 62 is similarly constructed with type LM318 high-performance operational amplifiers A1, A2 manufactured by Texas Instruments, Inc. of Dallas, Tex. The input signal RECEIVE from the transducer T is AC-coupled through input current-limiting resistor R58 and capacitor C26 to the noninverting input of amplifier A1. Diodes CR8, CR9 provide input protection. Negative feedback from the output of amplifier A1 is provided to the inverting input through resistor R52. Feedback resistors R52 and R56 are selected to provide 30 dB of gain at 200 KHz. Resistor divider R54, R55 provide voltage and current biasing for the inputs of the amplifier A1, while resistor R57 establishes the input impedance of the amplifier and provides input biasing current for the noninverting input. Capacitors C24, C25 are for power supply filtering and for providing an AC reference at the amplifier inputs.

The output from amplifier A1 from the amplifier stage 61 is AC-coupled through capacitor C23 to the noninverting input of amplifier A2 in the amplifier stage 62, and also to an input resistor R45 of a 200 KHz ceramic bandpass filter FL2. Amplifier stage 62 is constructed in a manner similar to that of amplifier stage 61 to provide 30 dB of gain. The output of amplifier A2 in the amplifier stage 62 is provided through input resistor R40 to a ceramic bandpass filter FL1 in the 200 KHz filter stage 64. In the preferred embodiment, both of bandpass filters FL1, FL2 are ceramic filters manufactured by Murata Manufacturing Company or Marietta, Ga., which provide a narrow band pass around 200 kHz.

The output of bandpass filter 64 is connected to the noninverting input of a comparator CP1 in a first detector stage 65. In a similar manner, the output of bandpass filter 63 is connected to the noninverting input of a comparator CP2 in a second detector stage 66. Each comparator CP1, CP2 is a type LM339 open-collector output voltage comparator manufactured by Texas Instruments.

The inverting inputs of each of comparators CP1, CP2 are connected on line 71 to the output of a logarithmic DAC 70 for selection of a variable comparator threshold. The log DAC 70 comprises a type 4051 CMOS analog multiplexer circuit 72 manufactured by RCA Corporation. The select inputs A, B, C are connected to three sensitivity control signals SENS0, SENS1, SENS2, respectively, provided by microcomputer 20. The analog input lines X0–X7 of multiplexer 72 are connected to resistors R6–R13; those skilled in the art will understand that the select signals SENS0, SENS1, SENS2 connect one of the eight resistors R6–R13 to the output OUT on line 71, and thus to the noninverting inputs of the comparators CP1, CP2. The selected resistor together with resistors R42, R43 form a resistor divider operative to provide a threshold voltage at the noninverting inputs of the comparators CP1, CP2.

Resistors R41, R44 serve as input pull-up resistors for the noninverting inputs of the comparators so that node 74 serves as AC ground. Capacitor C20 parallels threshold setting resistor R43 to filter internally generated noise. Inasmuch as the voltage divider formed by resistors R42, R43 is connected to a 5 volt power source, the AC ground at point 74 will be maintained fairly near the center point of 12 volts, which is well within the common mode voltage range of the comparators.

The resistors R6-R13 are selected in increments according to the following table to provide 3.75 dB steps so that a sensitivity range from 0 to 30 dB for each of the comparators CP1, CP2 is provided:

| Resistor | Value |
|----------|-------|
| R6 | 86.6K |
| R7 | 140.0K |
| R8 | 221.0K |
| R9 | 348.0K |
| R10 | 536.0K |
| R11 | 825.0K |
| R12 | 1.3M |
| R13 | 2.0M |

The open-collector output of comparator CP1 is tied to a +12 volts through resistor R32 and connected to the noninverting input of a third comparator circuit CP3, and to C13. R32, C13 and CP3 form a post detection filter. R32 and C13 are selected so that when a detectable signal is present at the input of CP1, C13 will not charge to above the threshold established by R33 and R34.

The output of comparator CP3 is tied to +5 volts through resistor R3, and the inverting input is connected to 6 volts as determined by voltage divider comprising resistors R33, R34. In a similar manner, the output of comparator CP2 is connected to the noninverting input of a fourth comparator CP4, also configured to serve as a post detection filter. It will now be understood that an input voltage to either comparators CP3, CP4 resulting from an output from either of comparators CP1 or CP2 causes the outputs DETECT1 and DETECT2 to swing from 5 volts to 0 volts, indicating the detection of a signal by the detect stages.

It will now be understood that sixteen different sensitivity levels are provided by the circuitry illustrated in FIG. 9, by selection of one of eight possible threshold settings through log DAC 70 to comparator CP1 or CP2, and by selection for reading of either the output signals DETECT1 or DETECT2, depending on whether the 60 dB amplifier stage 62 or the 30 dB amplifier stage 61 is read. For example, the lowest sensitivity setting requires a strong input signal in order to produce an output. A strong signal, which corresponds to a strong sonar reflection, will produce an output on the detect line DETECT2, when the smallest resistor in the log DAC 70 is selected, since R6 together with R43 provides the highest possible threshold at the noninverting inputs of comparators CP1, CP2. It will also be appreciated that a signal will occur on both of the detect lines DETECT1 and DETECT2 for a large input signal. A weaker input signal might result in an output on the DETECT1 line, but not the DETECT2 line.

The highest sensitivity occurs with the selection of the largest resistor R13 by the log DAC 70, which results in the smallest threshold voltage at the noninverting input of the comparator CP1. Accordingly, the weakest input signal provided by the amplifier stage 62 which is of magnitude greater than the threshold voltage at comparator CP1 causes an output at the DETECT1 line.

It should now be understood that the receiver circuitry 24 comprises a fixed gain amplifier and a selectively variable sensitivity detector, possessing sixteen different sensitivities, varying in 3.75 dB steps from 0 to 56.25 dB of amplifier gain. It will also be appreciated that varying detector sensitivity instead of varying amplifier gain prevents the creation of transients on the outputs of the amplifiers which may be misinterpreted as valid sonar returns and require additional filter stages or other signal processing to ensure that the transients are not treated as a valid sonar return. Accordingly, it will be appreciated that the variable sensitivity receiver construction reduces the likelihood that the circuitry will provide a false target indication, since the amplifiers are always amplifying at maximum.

It will also be appreciated that troubleshooting the variable sensitivity receiver 24 of FIG. 9 is simpler since the both of the amplifier stages 61, 62 have fixed 30 dB gains. Injection of a test signal should always result in the same amplification. Moreover, troubleshooting the variable sensitivity threshold levels is simplified since the log DAC switches between DC voltages.

CIRCUITRY AND PROGRAM OPERATION

Turning to Appendices I-XXII, the general operation of the circuitry comprising the preferred embodiment will now be described. Appendices I-XXII are pseudocode listings, tables and the like, which illustrate the sequence of steps which is embodied as the preferred program for microcomputer 20, and the program variables employed in connection therewith. Those skilled in the art will understand and appreciate that a depth sounder apparatus as described herein may be constructed by circuits comprising digital and analog hardware, or by preferred embodiment, as disclosed herein, employing a programmed microcomputer together with the disclosed peripheral digital and analog hardware. It will be understood that the embodiment disclosed herein is merely illustrative and that the functional equivalents of microcomputer 20 may include other devices including digital hardware, firmware or software, which performs the described functions and sequences in the depth sounder apparatus. It will be further understood that the microcomputer 20 may be programmed to perform the steps to be described in connection with the pseudocode listing of the Appendices.

Appendix I is a dictionary listing of the variables referred to in the pseudocode listing of other Appendices. Those skilled in the art will understand that the variable names encountered in the tables and pseudocode program listings of the remaining appendices are defined and described in Appendix I.

Appendix II is a memory map of the data required to drive the preferred LDC module 32. This map corresponds to the information which is in the display controller 32, in the format shown in Appendix II. The display memory map comprises an array of four eight-bit bytes wide by 62 bytes long (for a total of 248 bytes).

The individual bytes in the 248 byte array are addressed with the chip select (CS) and address (AD) information in the two leftmost columns of Appendix II. Any portion of the display area 15 (FIG. 1) may be individually addressed and the data shown in Appendix II provided for updating the information being displayed with a display module chip selection (CS) address and an address (AD) 0-49 (decimal) provided in binary on the data input lines DB0-DB7 of the module 32 while A0=1. Then the pixel data is transferred by providing it in binary on the data input lines DB0-DB7 while A0=0. As described in connection with FIG. 8, there are three chip select lines on the display controller 32, CS1, CS2 and CS3.

The topmost four bytes of display data in Appendix II correspond to the sensitivity bar or cursor SC displayed at the top of the screen 15. For example, and referring in particular to FIG. 13, the sensitivity cursor SC is shown as being nine pixels wide. The total sensitivity settings possible in the disclosed embodiment are sixteen; each sensitivity increment requires two bits but only fifteen increments are displayed since the display is only 30 pixels wide. Accordingly, four eight bit bytes of sensitivity data are required to create a fifteen increment sensitivity bar graph.

Bit 6 of chip 1, address 0 controls the automatic or "auto" annunciator 80, illustrated in FIG. 13. A "1" in this position causes the "auto" condition to appear on the display.

Addresses for chips 1 and 3, addresses 1–49, and chip 2, addresses 0–10 and 12–22, correspond to a 30×60 pixel matrix. It will thus be seen that there are provided 60 rows of pixels, with each row having 30 pixels of display information.

Bit 6 of chips 1 and 2 of the display area for rows 1 through 60 provides for creation of the zoom or expansion cursor ZC, as illustrated in FIG. 13. The zoom cursor, as has been described, corresponds to a predetermined range of depths, and is generated in a manner which will be described below.

Bit 7 of chips 1 and 2 shown in Appendix II corresponds to the alarm cursor AC, which can extend the height of the display.

The bottom row in Appendix II corresponds to selection of depth range annunciators or indicators. The least significant bit in each of the four bytes corresponds to the 15, 30, 60 and 120 foot depths, respectively. A "1" in the least significant bit position of these bytes causes the display controller 32 to display the selected depth scale annunciator.

Bit 6 in the bottom row corresponds to the zoom annunciator "Z" which may be seen at 81 in FIG. 14. For example, in FIG. 14, a "1" has been provided in the bit 6 position for chip 2, address 23.

Appendix III is a display map of a section of RAM that is used to construct an image before it is transferred to the display. As described in connection with Appendix II, 62 eight-bit bytes are provided to the display at the chip select (CS) and addresses shown in Appendix II. Appendix III corresponds to addresses in RAM 50, 51 of FIG. 8 wherein data to be transferred to the display controller 32 is assembled prior to being transferred from the RAM to the display controller by the microcomputer.

Appendix IV illustrates the sensitivity table, which is a section in the ROM 52 which contains a five bit number three of which are used for selecting one of eight possible sensitivity settings for the two detector stages illustrated in FIG. 9. The other two bits select one of the two detect signals DETECT1 and DETECT2 in order to obtain the total number of sixteen different sensitivity levels.

Appendix V is a filter lookup table in ROM which is employed to implement an M-of-N correlation filter. As will be described further in greater detail below, microcomputer 20 is programmed to require two return signals from three consecutive transmissions in order to confirm that a valid sonar return has been detected; any two returns from three transmissions corresponds to a valid signal. The results from three transmissions forms a three-bit word, which is used to index the lookup table shown in Appendix V. Those skilled in the art will understand that employing a lookup table to handle the mathematical computation in an M-of-N filter is quicker than programming the microcomputer to perform these computations. The input for the lookup table is the three-bit input S0–S2, as described in Appendix VI.

Appendix VI is the target data range table. The range table is a section of memory which is used to contain a sampled bit from the receiver circuitry 24 every three inches of depth for each of the last three transmissions. As seen in Appendix VI, 480 bytes of data are required for storing data samples to 120 feet of depth; the three samples comprise the bits S0–S2, with S0 representing the most recent transmission. The range table is maintained as a first-in, first-out stack, with the most recent sample always being stored in the least significant bit position, the oldest sample being discarded at the most significant bit position, and the three bits S0–S2 forming a three-bit number for indexing the lookup table of Appendix V.

Appendix VII is the depth range table, which is used by the automatic range program module 1234 described below; this module automatically selects an appropriate depth scale based upon the depth of the detected bottom when in the automatic mode. This table contains limit data for determining whether the next shallower or the next deeper scale should be selected. For example, if the device is presently displaying data at the 30 foot depth scale, the auto range module periodically accesses the depth range table of Appendix VII to determine whether the 15, 60 or 120 foot depth range should be selected next, or whether the 30 foot depth range should be maintained.

Appendix VIII is the sensitivity table, which is a section in the ROM 52 (FIG. 8) that contains a minimum sensitivity setting used by the auto sensitivity program module 1232 described below; this module automatically selects an appropriate sensitivity setting based on the density of data being received when in the automatic mode. The table is indexed by depth, and contains upper and lower limits ASUL and ASLL, respectively, which are employed by the auto sensitivity module to select the appropriate sensitivity setting.

Appendix IX is a map of the video memory, which is a section of the RAMs 50, 51 that store target data indexed by depth in a circular spool. As shown, there are provided seven blocks of data, each block being one byte wide, and each block being 480 bytes long. Each bit corresponds to the results of the RECEIVE program module 122, which is described below. The VIDEO bit is the result of the M of N correlation filter, and is an indication whether a target has been detected at the corresponding depth shown in the appendix. Since a full screee of 30 pixels requires four eight-bit bytes of data (see Appendix II), the seven blocks provide for storage of almost two full screens of prior-displayed target data. These data can be recalled and redisplayed by reverse-scrolling back onto the screen; more recent data is stored in circular buffer fashion as it "exits" the right side of the screen.

Turning to Appendix X, there will now be described the pseudocode program for microcomputer 20, which effectuates the various functions of the preferred embodiment of the depth sounder apparatus described herein. The program illustrated in Appendix X comprises a series of program modules, each of which is identified by a module number. The inputs for various modules are listed in the left hand column, while the outputs from the modules are listed in the right hand columns.

The main program begins at 100. At 110, a series of diagnostic routines known to those skilled in the art are run, which provide the operator with information concerning the status of the system and whether any error conditions or malfunctions have been detected.

At 111, an initialize routine, also known to those skilled in the art, is executed, which resets internal registers, clears the memories, and performs other functions required to prepare the microcomputer for program execution.

At step 112, an endless "do" loop is begun. Step 121 indicates that the TRANSMIT routine 121 is executed, and a series of sound pulses are transmitted. At step 122, the RECEIVE routine is executed, and the depth sounder is conditioned to receive reflected echo pulses.

At step 123, data received by the RECEIVE routine is analyzed to determine whether a valid target is detected. Step 123 comprises modules 1231, 1232, 1233, 1234 and 1235. Step 1231 is a correlating filter routine wherein the received data is subjected to an M-of-N filter. As described above, two targets detected in three transmissions results in the detection of a valid target. Step 1232 indicates the AUTO SENSITIVITY module, wherein the depth sounder determines the appropriate sensitivity setting for the receiver circuit. Step 1233 indicates the BOTTOM module, wherein the apparatus analyzes the data and determines depth of the bottom of the body of water. Step 1234 indicates the AUTO RANGE module, wherein the appropriate depth scale is selected. Step 1235 indicates the ALARM module, where the data is analyzed to determine whether an alarm should be sounded.

After completion of the data analysis in module 123, the UPDATE VIDEO RAM routine is executed, to move the newly-acquired target data into the appropriate portion of the spooled memory described above in connection with Appendix IX.

Finally, at step 125 the UPDATE DISPLAY routine is executed, wherein the display controller 32 is updated from the video memory.

Appendix XI is a pseudocode listing for interrupt handling. As described above in connection with FIGS. 5, 6 and 7, depression of a switch on the switch panel 16 causes an interrupt to the microcomputer 20. The microcomputer 20, if not disabled due to execution of a noninterruptable portion of the program illustrated in Appendix X, determines which of the keys has been selected through a scan and debounce routine, and performs the appropriate action in response to the depressed switch. Those skilled in the art will understand how to construct interrupt-handling routines to respond to switch actuation, and hence no further discussion of same will be provided herein. The number read from encoder 43 on the lines ROWQ0, ROWQ1, ROWQ2, as determined by the selected column COL1, or COL2, provides an index for jumping to the appropriate routine which responds to the depressed switch.

Appendices XII through XXII are pseudocode listings for the various program modules identified in Appendix X. While the functioning of certain of these routines will be understood by those skilled in the art, further discussion of certain of the routines will be provided below for clarification.

The RECEIVE routine module 122 in Appendix XIII is operative to fill a column in the target data range table (Appendix VI) with target data. It will be recalled from the discussion above that the range table extends in three inch increments from 0 to 120 feet, for a total of 480 values. The range table pointer (RAT) is first initialized, and the routine illustrated repeated for each step from 0 to 479.

It will be observed that before execution of the RECEIVE routine 122, bit 0 is a "don't care" or "x" condition, whereas after the RECEIVE routine, new data is acquired (S0) and used with prior data S1–S2 as input to the filter module 1231. The M-of-N filter routine 1231 places a "1" or "0" as the VIDEO bit, with a "1" indicating detection of a target. The three consecutive data samples S0–S2 which resulted in the determination of the presence of a target are shifted over into bits 1 through 3.

It will also be observed in connection with the RECEIVE routine 122 that the range table pointer (RAT) is compared to a sensitivity time control (STC) for minimizing surface clutter. As defined in Appendix I, the STC or "sensitivity time control" relates to a predetermined depth after which the sensitivity of the receiver is increased in a stepwise fashion by the AUTO SENSITIVITY module 1232. As will be known to those skilled in the art, surface clutter is a common problem in depth sounders. By maintaining the receiver at a low sensitivity until sonar returns are expected from a predetermined depth, about 8 feet in the preferred embodiment, the apparatus is desensitized to surface clutter, yet still is responsive to strong signal returns as when the water is extremely shallow or an underwater obstacle is detected.

The M-of-N filter routine 1231 of Appendix XIV is operative to "filter" each byte in the range table to determine whether or not a valid target has been detected. The filtration is accomplished by taking bits S0–S2 of the target data range table (Appendix VI) and using this three-bit word to index the lookup table of Appendix V. In the event that the two of the three bits are a "1", it is thereby indicated that a valid target has been detected, and the VIDEO bit will be set by the routine by setting a "1" in bit 0 in the range table.

The AUTO SENSITIVITY module 1232, shown in Appendix XV, is operative to adjust the sensitivity of the receiver automatically, in response to the average amount of data. The routine operates to increase or decrease the sensitivity of the amplifier as a function of the amount of signal returns being received for the bottom. The routine is operative only if the automatic or "auto" mode has been selected by the operator; if the depth sounder is not in the automatic mode, the operator may manually adjust the sensivity to any desired level by actuation of the appropriate sensitivity "up" or "down" switches.

First in the module 1232, all the VIDEO bits in the target data range table that are within a window defined by the variables UPPER and LOWER are summed, and the sum is placed in an eight-byte spool or circular buffer known to those skilled in the art. Then, the interrupt is disabled to prevent exiting until the spool pointer has been set. This is necessary in the disclosed embodiment because an interrupt generated by depression of a switch typically causes a change, which will disrupt the placement of data in the buffer. After the pointer for the spool buffer has been set, the interrupts are re-enabled.

The eight values obtained from the circular spool count are then summed to obtain a number denominated SUM. This is the sum of the number of "on" VIDEO bits in the target data range table between UPPER and LOWER as illustrated in Appendix XIII.

The next step taken is to determine if the automatic mode has been selected. If not, the routine exits. If the automatic mode has been selected, AUTO=1, the routine determines whether a flag indicative of "bottom lock" has been set. This flag, LOCK flag, is provided from the BOTTOM routine 1233, described below, and is an indication that the depth sounder is locked onto the bottom of the body of water. If the locked condition exists, then the depth of the bottom is used as an index into the sensitivity table of Appendix VIII, to determine appropriate minimum sensitivity settings for the receiver, and to obtain the values for the variables ASUL and ASLL, which correspond to "automatic sensitivity upper limit" and "automatic sensitivity lower limit" as defined in Appendix I.

In the event that a bottom lock condition does not exist, default values for the minimum sensitivity setting, ASUL and ASLL are selected. If the bottom lock condition is not present, the default minimum sensitivity setting in the preferred embodiment is decimal 3 (of sixteen possible).

The ASUL and ASLL thereby obtained are then employed to determine whether to increment or decrement an "auto counter" defined as AUTOC in Appendix I. The auto counter is employed to slow the response time of the AUTO SENSITIVITY routine 1232. The value SUM is then compared to the ASUL and ASLL, resulting in incrementing or decrementing the value of AUTOC; however, the value of AUTOC is not permitted to exceed an upper and lower limit, ACUL and ACLL. In the event that the value of AUTOC has reached an upper limit of ACUL, it is thereby indicated that the sensitivity of the amplifier is too high, and the sensitivity is decreased but not below minimum sensitivity. The value of AUTOC is then reset in a "middle" position by resetting to the average of the auto count upper limit (ACUL) and auto counter lower limit (ACLL). In a similar manner, if the value of AUTOC has reached a lower limit (ACLL), it is thereby indicated that the target returns are too infrequent, and the sensitivity is increased. Again, after increasing the sensitivity, the value of the auto counter variable AUTOC is reset to a middle value.

It will now be understood that the foregoing steps in the AUTO SENSITIVITY module 1232 cause the depth sounder to be responsive to a "running average" number of target returns in a window surrounding the bottom received over the last eight transmissions. Moreover, the automatic adjustment is dependent on the "bottom lock" condition; a predetermined number of returns corresponding to a wide target (i.e., the bottom) is required for this to occur. Accordingly, if too few bottom returns are received, the sensitivity is increased; likewise, if too many bottom returns are received, sensitivity is decreased. This module thus serves to aid the BOTTOM module 1233 in locking to the bottom.

Next will be described the BOTTOM program module 1233 of Appendix XVI, which is operative to examine the VIDEO data in the target data range table and identify the sonar returns which correspond to the bottom of the body of water. The routine locates the "widest" target (that is, the target having the greatest depth range) located between the variable UPPER and the variable LOWER. The variable UPPER is initially set to 0, and the variable LOWER is initially set to 120 feet, and the module then iteratively narrows the range gap between UPPER and LOWER until the bottom is located.

In order to describe the method whereby the bottom is located, reference is first made to FIG. 10. Those skilled in the art will understand that a sonar transducer T does not transmit sound pulses in a narrow, collimated beam. Rather, the beam forms a "cone" dispersion pattern. The sonar return C perpendicularly beneath the transducer T may be considered as a straight line extending to the bottom. However, the actual cone-shaped beam creates sonar returns along the lines L and R where R is the shortest and L is the longest line extending from the transducer to points on the bottom within the cone. Accordingly, the bottom of the body of water, if it possesses an uneven terrain as illustrated in FIG. 10, will produce a sonar return having a width W. W is the difference in length between the longest and the shortest lines extending from the transducer to points on the bottom that are within the cone. Even if the bottom is flat and smooth, the sound pulses along the outside of the cone will take longer to reach and return to the transducer, since such pulses travel along the hypotenuses of right triangles bounded by C.

Figure 12:
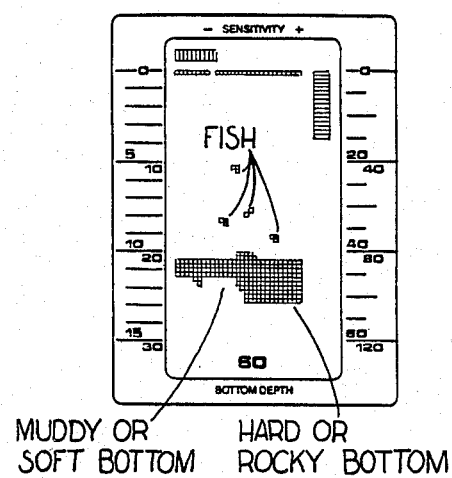
FIG. 12 is an exemplary display screen showing different bottom characteristics.

As illustrated in FIG. 12, a muddy or soft bottom produces a bottom return which is narrower than a hard or rocky bottom, since a hard or rocky bottom reflects more of the sound pulses. FIG. 11 illustrates a bottom return and a re-echo return. As may be seen in FIG. 11, the bottom sonar return is "wider" than the re-echo return when the sensitivity is properly adjusted, which may result from reflections of the sound pulses from the bottom of the boat, the surface of the water, and the like. Accordingly, the BOTTOM module 1233 is operative to find the widest return, mark this return as the "bottom" of the body of water, and to fill in areas of the display screen beneath the indicated bottom to eliminate operator confusion or ambiguity which may result due to re-echoes or varying bottom conditions.

Referring back to Appendix XVI, and the BOTTOM module listing 1233, the first step taken is to locate the widest target between the values of the variable UPPER plus ten feet and the value of LOWER minus ten feet. A minimum width of one foot is required in the preferred embodiment. In the event that two or more targets have the same width, the shallower or higher target is provided a one foot advantage, since it is more probable that the shallower return is the true bottom and that the deeper-appearing return is a re-echo.

In the event that a "good" bottom is found, that is, the widest target is greater than one foot wide, then the value of FIND is incremented; the variable UPPER is set to the shallower depth of the widest target, and the variable LOWER is set to the deeper depth of the widest target. FIND is a counter which is used to count the number of consecutive "good" bottoms found by the BOTTOM module 1233. The value of FIND is compared to an upper limit constant FINDUL, which is a predetermined number, say, 5. In the event that the FIND counter equals the predetermined number FINDUL, then the system has "found" the bottom. The following actions are then taken: a "lock" flag LOCK is set to a "1" to indicate that the bottom has been found; a "lost the bottom" flag LOOSE is set to "0" to indicate that the system is not presently seeking the bottom; and, the value of the variable UPPER1, which contains a number corresponding to the depth of the locked-on bottom, is set equal to the value of the UPPER variable.

It will be noted that UPPER1 corresponds to the depth of the bottom line BL in FIG. 1.

In the event that a "good" bottom is not found, the following actions are taken. The value of the FIND counter is set to "0", so that the module can be reset to begin trying to "find" the bottom again. The values of UPPER and LOWER are "opened" up again to 5 and 118 feet, respectively. It will be appreciated that if a "good" bottom was "found" in the steps above, the values of UPPER and LOWER would have iterated towards a relatively narrow range within which the bottom was located. It will also be appreciated that, initially, the value of UPPER will be 0 and the value of LOWER will be 120 feet, since the bottom has not yet been located and locked, and can occur anywhere within the operable range of the apparatus.

Additionally, the LOOSE flag would be incremented, which provides a count of the number of passes through the module wherein a "good" bottom has not been found. The value of LOOSE is compared to an upper limit LOOSUL. If the value of LOOSE reaches the upper limit LOOSUL, then the system has lost the bottom, and the LOCK flag is set to "0", indicating that the program has not found the bottom. It will therefore be understood that the device must "lose" the bottom a predetermined number of times, as determined by the value of LOOSUL, before clearing the LOCK flag, to prevent loss of bottom lock due to spurious conditions.

Finally, in connection with the BOTTOM module 1233, if the apparatus is in the "auto" mode, and the LOCK flag is set, indicating that the bottom is "locked on", all VIDEO data in the target data range table beneath the depth value stored in UPPER1 is set to a "1" to fill or "black in" the display beneath the detected bottom. For example the areas 84, 85 in FIGS. 11 and 12 are filled in. It will of course be understood that areas beneath the bottom line or UPPER1 need not be totally blacked-in, inasmuch as other patterns on the display, preferably uniform, can be successfully employed to "color" the display to obscure any ambiguous or superfluous sonar returns such as re-echoes below the bottom line.

It will thus be appreciated that the screen generally takes on the appearance of FIGS. 13, 14, 15 or 16, instead of FIGS. 11 and 12, as areas of the screen below the bottom are filled in or otherwise "painted".

If in the auto mode and the bottom is not locked on, the display is cleared by changing all VIDEO data in the target data range table to "0". In the auto mode, if the apparatus is not locked to the bottom, the screen and memory are cleared to allow data acquisition to find and lock on the bottom.

The AUTO RANGE module 1234 in Appendix XVII instructs the microcomputer to be responsive to the LOCK flag (when the bottom is "locked on") to automatically adjust the depth range to keep the bottom from going off the display. When the bottom is becoming deeper, the bottom could conceivably go "off scale". Similarly, when the bottom is becoming shallower, the meaningful area of the display could become extremely small if in one of the deeper depth scales. In the event that the automatic mode is selected (AUTO=1), the zoom mode is not selected (ZOOM=0), and the bottom is locked on (LOCK=1), this module executes to select the appropriate depth range.

In the module 1234, the value of the variable UPPER1 is used to index the depth range table in ROM (RANGET; see Appendix VII). A depth counter variable (DEPTHK) is employed to determine when the depth scale should be decreased. If the new indicated depth is shallower than the old depth, then DEPTHK is decremented. However, if DEPTHK reaches 0, indicating that five passes through this module have occurred, then the next shallower scale is selected and the depth counter DEPTHK is reset to 5. It should be noted that the depth counter DEPTHK is should be noted that the depth counter DEPTHK is employed for the purpose of preventing oscillation between scales, in that a shallower depth scale is not selected until a plurality of accesses into the depth range table have indicated that a shallower scale should be selected.

As illustrated in FIG. 15, the bottom line BL, which it will be recalled scrolls from right to left across the screen, appears to be getting deeper. This situation frequently occurs as a boat carrying the present invention enters deeper water. With the operation of the auto scale change, when the bottom has reached a predetermined maximum depth the next deeper scale (60 feet) is selected, and the entire display is reformatted to reflect selection of the new depth scale, as illustrated in FIG. 16. It will be appreciated from a comparison of FIGS. 15 and 16 that the display reformatting is complete and does not result in the creation of any discontinuities, in that previously displayed data to the left of the most recent target data is reformatted to be in correspondence with the newly selected depth scale.

After the selection of either a shallower or deeper depth scale, the appropriate width of the zoom or expansion region represented on the screen by the zoom cursor ZC, is set. The zoom region, represented by the variable REGION, is 7.5 feet for the 15 and 30 foot scales and 15 feet for the 60 and 120 foot scales. Other values may also be successfully employed.

In the module 1235, in Appendix VXIII, the data in the target data range table is examined to determine whether to trigger an alarm. It will be understood from a review of this listing that the detection of a target at a depth less than the depth of the alarm depth variable ALDEP causes an audible alarm to be triggered.

The UPDATE VIDEO RAM module 124 shown in Appendix XIX, is operative to copy VIDEO data in the target data range table (RAT) to video memory (Appendix IX). As has been previously discussed, the preferred embodiment is operative to provide a "reverse" feature, wherein target data which occurred prior in time to data being currently displayed can be recalled from memory and scrolled onto the screen. The module 124 transfers data from the target data range table into video memory, and maintains track of pointers to these data so that up to two full display screens can be preserved in memory, and recalled by reverse scrolling from the left hand portion of the display area 15 toward the right.

In normal operation of the disclosed embodiments, the most recent target data is displayed in the rightmost column of the display screen, and moved or shifted successively from right to left 30 positions across the display area 15, until it appears to "exit" on the left hand side of the display area. The target data then is successively shifted over another twenty-six columns in video memory for a total of fifty-six columns (7 eight-bit bytes). This data can be recalled at any time by reverse scrolling until the video memory pointer "wraps around" and the data is overwritten, since the video memory is a circular buffer. Those skilled in the art will therefore understand that all data in the video memory is not actually shifted to successive positions, but that a circular buffer arrangement employing address pointers is employed to effectuate this feature.

It should also be understood that the data presently being displayed occupies four of the seven blocks of data in the video memory, while previously-displayed data occupies the remaining three blocks. All seven blocks contain data for the operable depth capability, down to 120 feet in the disclosed embodiment. Accordingly, it will be appreciated that data recalled from memory can be viewed at any depth scale, or expanded using the zoom mode.

The UPDATE DISPLAY module 125 in Appendix XX updates the display module 32 with the latest annunciator and target information. In the preferred embodiment, the display is updated as a function of the display speed. The display is updated by transferring the appropriate data from the video memory (Appendix IX) which corresponds to the selected depth setting and zoom region if ZOOM is active into a block of memory designated the "display temporary table" (DTT, Appendix III). The DTT is then output to the display module 32.

Updating is accomplished by first setting the varible UPDATE according to the selected speed of the display, as reflected by the value of the variable SPEED, which corresponds to the selected display speed. Then, a "video memory increment", that is, a range within the video memory that will be compressed into one row on the display, is calculated. This is accomplished by selecting a video memory increment according to whether the ZOOM bit is set, and the selected depth range. As can be seen in the Appendix, the video memory increment ranges between 3 inches and 24 inches.

Next, if the ZOOM mode has been selected, then the variable VIDEO MEMORY POINTER is set to the address of the ZOOM REGION in the video memory, REGION, so that data corresponding to the selected zoom region may be selected for transferring to the display. Otherwise, the value of the variable VIDEO MEMORY POINTER is set to 0, so that data may be transferred from the top or beginning of the video memory.

Next, a variable DTT POINTER is set to an initial value corresponding to the top of the target area, so that the pointer is initialized for transferring data from the video memory into the display temporary table.

Next, a "DO" iteration is executed until the DTT POINTER has reached the bottom of the target area. When the DTT POINTER has reached the bottom of the target area, the display temporary table will have been filled with target data. In accomplishing this task, rows of target data from the video memory starting at the address represented by the VIDEO MEMORY POINTER are retrieved and transferred to the display temporary table, extending to the address represented by the VIDEO MEMORY POINTER+VIDEO MEMORY INCREMENT.

This data must now be compressed so that all targets which exist in the video memory are reflected in the display temporary table. This is accomplished by logically ORing bits that are in the same column within the VIDEO MEMORY INCREMENT. The compressed row is then justified so that the most recent bit corresponds to the right side of the display in the preferred embodiment, wherein the most recent data appears.

Next, the justified, compressed row is transferred into the display temporary table at the address represented by the variable DTT POINTER.

The VIDEO MEMORY POINTER is then incremented by the value of the VIDEO MEMORY INCREMENT, and the DTT POINTER is incremented by one row, and the iteration repeats until the terminating condition (DTT POINTER=bottom of the target area) has been satisfied.

Finally, sensitivity cursor data, zoom cursor data, and alarm cursor data, where such data is available in the particular embodiment, is transferred to the display temporary table. In like manner, the annunciators AUTO, DEPTH and ZOOM are set in the appropriate locations in the display temporary table. The display temporary table is then transferred to the display memory in the LCD module.

The most recent target data always referred to in the video memory by the video memory pointer, but the data to be displayed is referred to by the BLOCK and COLUMN pointer. It will therefore be appreciated that data in the seven blocks illustrated in Appendix XI is transferred based on the BLOCK and COLUMN pointer, for thirty columns, and indexed vertically within the blocks by the VIDEO MEMORY POINTER variable. In normal operation, the BLOCK and COLUMN pointer aligns with and "follows" the video memory pointer so that the most recent target data is always displayed at the rightmost position on the screen. However, in the "reverse " mode, the starting address for the BLOCK and COLUMN pointer is set at successively shifting positions so that the display scrolls stored data onto the screen from the right towards the left.

It will now be understood that the display temporary table is filled by indexing with the current value of BLOCK and COLUMN and by indexing VIDEO MEMORY POINTER as generally described in the UPDATE DISPLAY module 125.

As the display temporary table is filled, the value of VIDEO MEMORY POINTER is incremented based on the current depth setting. Since data is displayed at different resolutions for different depth scale settings, VIDEO MEMORY POINTER must be incremented as a function of the depth setting. For example, if the 15 foot scale has been selected, then VIDEO MEMORY POINTER may be incremented by 3 inches, it being recalled that each pixel represents three inches. On the other hand, if the 120 foot depth scale is selected, then VIDEO MEMORY POINTER must be incremented by 24 inches, the minimum resolution displayable at this depth setting. It should be understood that if any target is present within these eight pixels, then a "1" is placed in the display temporary table and displayed, so that the presence of a target within this two foot depth increment can be communicated to the operator. It will of course be understood that the operator can select the zoom mode and have the region which contains the target expanded so that a more accurate viewing of the target to three inches of resolution can be had.

It will of course by now be understood that the ultimate effect of the UPDATE DISPLAY module 125 is to completely reformat the display when the depth scale changes, or when the zoom mode is entered or exited, or if the zoom cursor is moved up or down in the zoom mode. The module selects the appropriate data for the entire screen, even for past sonar returns (up to the amount of data stored in the video memory), and outputs this data to the display temporary table and thence to the display module. Any data which is mode or depth dependent is also reformatted, for example, a scale change from 30 feet to 60 feet, with the alarm cursor set at 15 feet, causes the alarm cursor to "shrink" in half, so that its endpoint still relates to the 15 feet depth or the 60 foot scale.

The ZOOM REGION modules 22C, 22D of Appendix XXI are operative to increase or decrease the depth of the zoom cursor by an amount equal to the length of one pixel, when the ZOOM RANGE UP and DOWN switches are pressed. This is accomplished by calculating the size of one pixel or increment of depth (i.e. three inches, six inches, one foot, or two feet, for the 15, 30, 60 and 120 foot depth scales, respectively) and adding or subtracting that amount to REGION. Thus, as the zoom cursor is advanced one increment, the appropriate offset can be selected for the VIDEO MEMORY POINTER so that target data is displayed at the appropriate depth.

It will be understood that an ALARM UP/DOWN module 22E similar to Appendix XXI is employed to raise or lower the endpoint of the alarm cursor AC in embodiments with the alarm feature, in response to actuation of the ALARM mode select switch and the ALARM DEPTH SET up or down switches, thereby setting ALARM mode flag and the variable ALDEP. As an example, in FIG. 13, the 60 foot depth scale has been selected, while the zoom region ZC is illustrated as corresponding to 27 feet to 42 feet. When the zoom mode is selected as in FIG. 14, the zoom cursor ZC remains referenced to the 27 or 42 foot marks on the 60 foot scale, so that the operator can mentally continue to associate the expanded display with the scale, but the targets 82', which in this case are most likely fish, show improved resolution. This occurs because in the zoom mode target data is displayed at the greatest stored resolution, or three inches.

It should also be understood that the reverse mode may be selected while the zoom mode is operative. In the specific example illustrated in FIG. 14, were the reverse mode selected, the targets 82' would move rightwardly in the display area 15, the targets 83' would scroll rightwardly off the display, while previously-viewed data stored in the video memory would enter the display area 15 on the left hand side.

Note that the targets 83 in FIG. 13 are revealed in FIG. 14 in the zoom mode at higher resolution to be fish 83'; in FIG. 13 it was not possible due to the resolution of the display to discern whether the targets were stumps, brush, rocks or the like.

The pseudocode program modules of Appendix XXII, SCAN KEYBOARD 21 and CASE SELECT 22 are responsive to switch selection and the interrupt-handling routine of Appendix XI. The CASE table, not illustrated, is a section of ROM that contains the starting addresses of switch handling routines indexed by switch number. Inasmuch as such switch-handling routines will be understood by those skilled in the art, no further discussion of same will be provided. It will be understood that these routines are operative to increase or decrease sensitivity in the manual mode, select the automatic or manual mode, increase or decrease the sweep speed (i.e. the rate of transmission and therefore the rate at which new target data enters the screen), increase or decrease the depth scale setting, turn the light on and off, scroll the display forward or reverse, stop the display, select the zoom mode, move the zoom region or cursor up or down, activate the alarm feature, and change the depth setting of the alarm cursor, depending upon the particular embodiment.

In another embodiment, reformatting of target data being displayed can be effectuated without employing as much memory as is present in the preferred embodiment. For example, an embodiment having a sufficient memory to store data currently being displayed, with data being discarded after the oldest data exits the screen, can be reformatted computationally. In such an embodiment, the microcomputer 20 would be operative to examine data in the video memory being presently displayed, extract target information row by row, and reduce the data to be displayed at a higher depth setting.

For example, as illustrated in FIGS. 15 and 16, if a scale change to a deeper setting is desired, such as from 30 feet to 60 feet, microcomputer 20 can examine the display memory pixel by pixel and divide by two, and replace the data in the display memory with the divided-by-two results. The microcomputer 20 would begin row by row at the top row, and move downwardly, without encountering problems of overwriting, since the operation would be essentially to "compress" or remap the information to appear smaller, since a large scale has been indicated.

It will of course be understood that such a remapping process requires elimination of information, and that resolution in the display is lost. In such an embodiment having only a display memory, the device is not able to accurately change from a deeper to a shallower scale, since an expansion of data would create an uncertainty as to target size and location. Accordingly, such an embodiment is preferred for reformatting data when shifting to a deeper scale.

In yet another embodiment, additional cost savings can be obtained while still retaining the screen reformatting or updating feature, by storing data at different resolutions for different depths. For example, in the preferred embodiment, data is resolved to three inches from 0 to 120 feet, requiring 480 bits. If data is resolved at three inches from 0 to 15 feet, six inches from 15 to 30 feet, one foot from 30 to 60 feet, and two feet from 60 to 120 feet, only 150 bits of storage per displayed column would be required. While such an embodiment would not have the improved resolution in the zoom mode of the preferred embodiment, such an embodiment would still be operative with automatic bottom detection and automatic scale change, but the size of the memory resources required for storage of the target data range table would be reduced from 480 bits to 150 bits.

In still another embodiment, screen reformatting or updating and a modified zoom feature can be effectuated with reduced memory requirements. In such an embodiment, as in the previously described embodiment, data is stored at a greater resolution for shallower depth scales, and at a lower resolution at higher depth scales. Screen reformatting to different depth scales would still operate as described above.

SWITCH PANEL

Figures 17, 18:
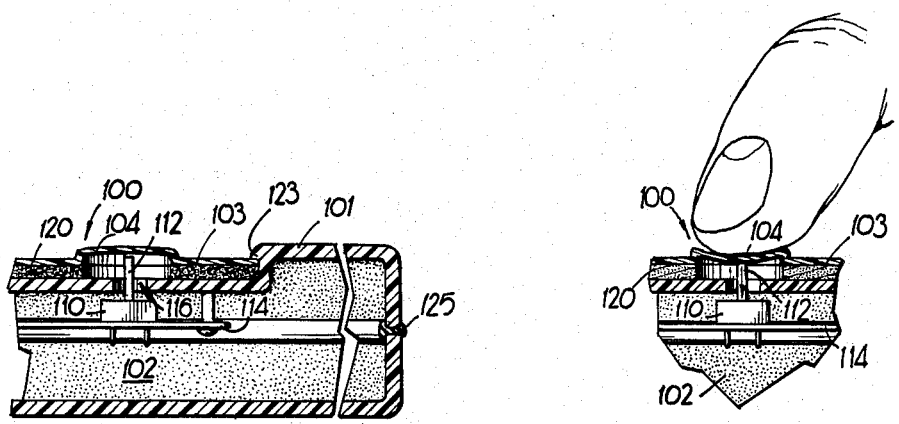
FIG. 17 is a partial cross-sectional view taken along the line 17—17 of FIG. 1, illustrating the switch construction.
FIG. 18 is a partial cross-sectional view of FIG. 17, showing depression of the switch.

The preferred embodiment of the depth sounder apparatus of the present invention employs an improved weather-resistant construction for the electrical switches on the switch panel 16. As illustrated in FIG. 1, a plurality of switches 100 are arranged in an array in the switch panel 16. As shown in FIG. 17, each of the switches 100 comprise a switch housing 101 which defines a waterproof interior area 102 for enclosing the electrical circuitry. In the preferred embodiment, the housing 101 is formed of a high impact molded polycarbonate thermoplastic or other plastic material which is prepared by methods known to those skilled in the art. The enclosure can be formed with upper and lower portions which are sealed at appropriate junctures such as 125 for obtaining access to the enclosed circuitry. Inasmuch as an overall enclosure seal forms no part of the present invention, the techniques for constructing same will be known to those skilled in the art, and there will be no further discussion of same herein.

Still referring to FIG. 17, each of the switches 100 comprises a planar overlay layer 103 formed of a resilient waterproof plastic material. The overlay 103 in the preferred embodiment includes a dome-shaped protrusion 104 which is formed in the overlay by vacuum molding or the like, which defines an actuator dome for the switch 100. Preferably, the overlay 103 is formed of a polycarbonate thermoplastic film material.

A linearly actuated push-button switch 110 including a vertically-moving actuator arm 112 is mounted beneath the actuator dome or protrusion 104. Preferably, the switch 110 is rigidly secured by soldering to a circuit board 114, which in turn is fastened by a screw 115 or the like to the housing 101. In the disclosed embodiment, the arm 112 of switch 110 extends through an opening 116 defined in the housing 101 and into the interior area of the protrusion 104. The preferred switch 110 is a conventional pushbutton switch, and provides both tactile and auditory feedback upon depression.

The plastic material forming the overlay 103 preferably possesses sufficient resilience to partially collapse inwardly upon depression by an operator, as illustrated in FIG. 18, but returns outwardly upon release by the operator to reassume the domed configuration. Accordingly, it will be understood that the switch 110 is actuated by depressing the protrusion 104, causing longitudinal or inward movement of the arm 112 of the switch 110, to close the electrical contacts contained in the switch.

In order to provide the water-resistant characteristics of the improved switch construction, a sealing layer 120 is interposed between the overlay 103 and the housing 101 during assembly. The seal is preferably a water-resistant rubber cement, plastic sealant or the like, which is coated along substantially the entire underside portion of the overlay 103 prior to placing the overlay on the housing, with the protrusions aligned with the openings 116.

It will now be understood that the seal between the overlay and the housing provides a water-tight seal which is virtually impervious to rain, boat spray, or other climatic conditions, yet which allows convenient actuation of the switch 110 to operate the circuitry. The sealing layer 120 is preferably coated on the entire switch panel 16 in areas surrounding the switches 100 and along the borders 122, 123 where water might attempt to penetrate and enter beneath the overlay. With a seal as described herein, sealing along the edges or borders 122, 123 is simpler and more water-resistant than attempting to create separate seals for each switch panel, a technique commonly employed in the prior art. It will therefore be appreciated that such construction provides improved water-resistant characteristics due to removal of weather resistant seals from the area immediately adjacent to switches to the area around the periphery of the switch mounting, since a single, substantial, and wide coating of sealing material which can be employed for superior and long lasting sealing characteristics.

The foregoing has been a description of the structure and operation of the preferred embodiment of the present invention of a depth sounder apparatus. It will be appreciated that other alternative functions and sequences of operation of the depth sound apparatus may be performed by the structure described herein while still remaining within the scope of the present invention. It will be appreciated by those skilled in the art that the apparatus disclosed herein may be arranged so that the functional operation of the apparatus may be readily modified by changing certain circuit connections or by changing the programmed sequence of operation of the microcomputer. Thus it will be appreciated that the foregoing description has been merely illustrative, and that the present invention is limited solely by the appended claims.

APPENDIX I

Dictionary

ACLL: Auto counter lower limit. The auto counter will never be allowed to be lower than the constant ACLL.

ACUL: Auto counter upper limit. The auto counter will never be allowed to be higher than the constant ACUL.

ASLL: Automatic sensitivity lower limit. If the number of "on" video bits as recorded in the spool is less than ASLL then action is taken to raise the sensitivity. This is the default value.

ASUL: Automatic sensitivity upper limit. If the number of "on" video bits as recorded in the spool is greater than ASUL then action is taken to lower the sensitivity. This is the default value.

ALARM: Alarm mode flag. If ALARM=1, then the apparatus is in the alarm mode.

ALDEP: Alarm depth register. ALDEP is an 16-bit register that stores the depth of the end point of the alarm cursor.

AUTO: Automatic mode flag. AUTO is an 8-bit register. If AUTO is non-zero then the apparatus is in the automatic mode; if AUTO=0 then the apparatus is in the manual mode.

AUTOC: Auto counter. AUTOC is an 8-bit register that is used to slow down the response time of the automatic sensitivity program.

BLOCK: Video memory block pointer. BLOCK is a 16-bit register that points to the block of video memory that corresponds to the most recent target data.

BLOCK1: Video memory block pointer secondary register. BLOCK1 is a 16-bit register that is used to save BLOCK while in the stop mode.

COLUMN: Video memory column pointer. COLUMN is an 8-bit pointer that points to the column within BLOCK that corresponds to the most recent target data.

COLUMN1: Video memory column pointer secondary register. COLUMN1 is an 8-bit register that is used to save COLUMN while in the stop mode.

DELAY: DELAY is the starting address of a delay table in ROM that contains delays in tens of microseconds.

DEPTH: Depth range register. DEPTH is an 8-bit register. DEPTH=0 corresponds to 15 foot depth range, 1 corresponds to 30 feet, 2 to 60 feet, and 3 to 120 feet.

DEPTHK: Depth counter. An 8-bit register used by the AUTO RANGE module. When DEPTHK=0 then DEPTH is allowed to decrease.

DTT: Display temporary table. DTT is an area of RAM that is used to construct an image before it is transferred to the display.

ERROR: Error flag. ERROR is an 8-bit register. If ERROR is non-zero then an error has occurred.

FIND: Find counter. FIND is an 8-bit register that counts the number of consecutive "good" bottoms that are found by the BOTTOM module.

FINDUL: Find counter upper limit. FINDUL is a constant that FIND will never exceed.

FSTRPT: Fast repeat flag. FSTRPT is an 8-bit register. When FSTRPT is non-zero then repeatable key functions occur faster.

SENS: Receiver sensitivity. Sensitivity may vary from 0 to 14, and sets the sensitivity of the receiver.

SENST: The starting address of the Sensitivity Table.

I/O-DET: The output of the detectors in the receiver. I/O-DET is a 1-bit input to the microcomputer from each of two detector states. 0=No target, 1=target.

I/O-SENS: The receiver sensitivity control signals, I/O-SENS is a 3-bit output from the microcomputer.

I/O-LIGHT: The light control signal. I/O-LIGHT is a 1-bit output from the microcomputer. 0=on, 1=off.

I/O-XMIT: The transmitter control system. I/O-XMIT is a 1-bit output from the microcomputer. 0=on, 1=off.

LIGHT: The light flag. LIGHT is an 8-bit register. When LIGHT is non-zero the light will be on.

LOCK: Bottom lock flag. LOCK is an 8-bit register. When LOCK is non-zero then the BOTTOM module is locked to the bottom.

LOOSE: Loose counter. LOOSE is an 8-bit register that counts the number of "bad" bottoms found by the bottom module.

LOTAB: Starting address of the filter look-up table in ROM.

LOOSUL: Loose counter upper limit. LOOSE will never exceed the constant LOOSUL.

LOWER: Lower side of the bottom return pointer. LOWER is a 16-bit register that points to the row in the target data range table that is just below the last pixel associated with the bottom return by the BOTTOM module.

NODLY: No delay flag. NODLY is an 8-bit register. When NODLY is non-zero then no delay is encountered when repeating a held down key function.

PAGE: PAGE is an 8-bit register that points to one of two display video tables in the display module. PAGE may be 0, 1, 2 or 3.

RANGET: The starting address of the depth range table in ROM.

RAT: Starting address of the target data range table in RAM.

REGION: Zoom region pointer. REGION is a 16-bit register that points to the top row of the zoom region in video memory.

REPEAT: Repeat key function flag. REPEAT is an 8-bit register. When REGION is non-zero a request is made to repeat the key function.

REVC: Reverse counter. REVC is an 8-bit register that counts the number of the columns the display has been reversed when in the stop mode.

ROW: A variable used to construct an image in DTT.

SENSET: The starting address of the Sensitivity Table.

SPEED: Scroll speed. SPEED is an 8-bit register that ranges in value from 0 (slowest speed) to 7 (fastest speed).

STC: Sensitivity time control. STC is a 16-bit constant that points to the bottom of the STC region in the target data range table.

STOP: Stop mode flag. STOP is an 8-bit register. When STOP is non-zero then the apparatus is in the Stop mode.

UPDATE: Display update counter. UPDATE is an 8-bit register. When UPDATE=0 the display is updated.

UPPER: Upper side of the bottom return pointer. UPPER is a 16-bit register that points to the row in video memory that is just above the shallowest pixel that is associated with the bottom return by the BOTTOM module.

UPPER1: Upper side of the bottom return pointer secondary register. UPPER1 is a 16-bit register that is used to save UPPER when a "good" bottom is not found by the BOTTOM module.

VIDEO: The starting address of video memory in RAM.

ZOOM: Zoom on/off flag. ZOOM is an 8-bit register. When ZOOM is non-zero then zoom is on.

ADDENDIX II

Display Memory Map In LCD Module

| CS | AD | PAGE 0 OR 2 LSB-MSB | PAGE 1 OR 3 LSB-MSB | CS | AD | PAGE 0 OR 2 LSB-MSB | PAGE 1 OR 3 LSB-BIT5 | BIT6 | BIT7 |
|---|---|---|---|---|---|---|---|---|---|
| 3 | 0 | SC* | SC | 1 | 0 | SC | SC | Auto | X |
| 3 | 1 | Row 1 | Row 1 | 1 | 1 | Row 1 | Row 1 | Zoom | AC* |
| 3 | 2 | Row 2 | Row 2 | 1 | 2 | Row 2 | Row 2 | Zoom | AC |
| . | . | . | . | . | . | . | . | . | . |
| 3 | 49 | Row 49 | Row 49 | 1 | 49 | Row 49 | Row 49 | Zoom | AC |
| 2 | 0 | Row 50 | Row 50 | 2 | 12 | Row 50 | Row 50 | Zoom | AC |
| 2 | 1 | Row 51 | Row 51 | 2 | 13 | Row 51 | Row 51 | Zoom | AC |
| . | . | . | . | . | . | . | . | . | . |
| 2 | 10 | Row 60 | Row 60 | 2 | 22 | Row 60 | Row 60 | Zoom | AC |

ADDENDIX II-continued

Display Memory Map In LCD Module

| | | PAGE 0 OR 2 | PAGE 1 OR 3 | | | PAGE 0 OR 2 | PAGE 1 OR 3 | | |
|---|---|---|---|---|---|---|---|---|---|
| CS | AD | LSB-MSB | LSB-MSB | CS | AD | LSB-MSB | LSB-BIT5 | BIT6 | BIT7 |
| 2 | 11 | 15 (LSB) | 30 (LSB) | 2 | 23 | 60 (LSB) | 120 (LSB) | Z | X |

*SC = sensitivity cursor
*AC = alarm cursor
X = not used
CS = chip select
AD = address (decimal)

APPENDIX III

Memory Map For Display Temporary Table (DTT)

The Display Temporary Table is a section of RAM that is used to construct an image before it is transferred to the display.

| ROW | LEFT MOST BYTE | FIRST FROM LEFT | SECOND FROM LEFT | RIGHT MOST BYTE |
|---|---|---|---|---|
| Row 1 | 0 | 64 | 128 | 192 |
| Row 2 | 1 | 65 | 129 | 193 |
| Row 3 | 2 | 66 | 130 | 194 |
| . | . | . | . | . |
| . | . | . | . | . |
| Row 62 | 61 | 125 | 189 | 253 |

NOTE:
The numbers in the above table are all decimal addresses. All addresses in the above table are referenced to VIDEO + n, where n is an offset to an available RAM memory block. The bytes at the addresses go into the display with LSB on the left.

APPENDIX IV

Sensitivity Table

| ADDRESS | CONTENTS |
|---|---|
| SENST + 0 | I/O-SENS minimum |
| SENST + 1 | I/O-SENS Step 1 |
| SENST + 2 | I/O-SENS Step 2 |
| SENST + 3 | I/O-SENS Step 3 |
| " | " |
| " | " |
| " | " |
| SENST + 14 | I/O-SENS Step 14 |
| SENST + 15 | I/O-SENS maximum |

APPENDIX V

Filter Look-Up Table

The filter look-up table is a section of ROM that contains the results of the M-of-N filter function F.

| ADDRESS | CONTENTS |
|---|---|
| LOTAB + 0 | F (Input) |
| LOTAB + 1 | " |
| LOTAB + 2 | " |
| . | . |
| . | . |
| LOTAB + 7 | " |

Note:
F (Input) is M of N (2 of 3) filter function of 3-bit input S0–S2.

APPENDIX VI

Target Data Range Table Memory Map

This table is a section of RAM that contains a sampled bit from I/O-DET every three inches of depth for each the last three transmissions.

| ADDRESS | CONTENTS MSB LSB | RANGE |
|---|---|---|
| RAT + 0 | x x x x x S2 S1 S0 | 0.00 to 0.25 feet |
| RAT + 1 | x x x x x S2 S1 S0 | 0.25 to 0.50 feet |
| RAT + 2 | x x x x x S2 S1 S0 | 0.50 to 0.75 feet |

APPENDIX VI-continued

Target Data Range Table Memory Map

This table is a section of RAM that contains a sampled bit from I/O-DET every three inches of depth for each the last three transmissions.

| ADDRESS | CONTENTS MSB LSB | RANGE |
|---|---|---|
| . | . | . |
| . | . | . |
| RAT + 479 | x x x x x S2 S1 S0 | 119.75 to 120.00 feet |

Note:
S0 are samples for the most recent transmission, while S1 are samples for the next most recent transmission, and S2 are samples for the third most recent transmission.

APPENDIX VII

Depth Range Look-Up Table

The Depth Range Table is a section of ROM that contains the new depth range for the auto range module indexed by depth.

| ADDRESS | CONTENTS | |
|---|---|---|
| RANGET + 0 | Upper limit for the 15 foot depth range | |
| RANGET + 2 | Upper limit for the 30 foot depth range | 15 |
| RANGET + 4 | Upper limit for the 60 foot depth range | |
| RANGET + 6 | Upper limit for the 15 foot depth range | |
| RANGET + 8 | Upper limit for the 30 foot depth range | 30 |
| RANGET + 10 | Upper limit for the 60 foot depth range | |
| RANGET + 12 | Upper limit for the 15 foot depth range | |
| RANGET + 14 | Upper limit for the 30 foot depth range | 60 |
| RANGET + 16 | Upper limit for the 60 foot depth range | |
| RANGET + 18 | Upper limit for the 15 foot depth range | |
| RANGET + 20 | Upper limit for the 30 foot depth range | 120 |
| RANGET + 22 | Upper limit for the 60 foot depth range | |

APPENDIX VIII

Sensitivity Table
This table is a section of ROM that contains minimum sensitivity settings for the AUTO SENSITIVITY module indexed by depth.

| ADDRESS | CONTENTS |
|---|---|
| SENSET + 0 | Min. sensitivity for 0 < DEPTH < 8 feet |
| + 1 | ASUL |
| + 3 | ASLL |
| SENSET + 5 | Min. sensitivity for 8 < DEPTH < 16 feet |
| + 6 | ASUL |
| + 8 | ASLL |
| SENSET + 10 | Min. sensitivity for 16 < DEPTH < 32 feet |
| + 11 | ASUL |
| + 12 | ASLL |
| . | |
| SENSET + 75 | Min. sensitivity for 120 < DEPTH < 128 feet |
| + 76 | ASUL |
| + 78 | ASLL |

APPENDIX IX

Video Memory Map
A section of RAM used to store video (i.e., target) data indexed by depth in a circular spool.

| ADDRESS | CONTENTS |
|---|---|
| VIDEO + 0 | |
| VIDEO + 1 | |
| VIDEO + 3 | FIRST BLOCK |
| . | |
| VIDEO + 479 | |
| VIDEO + 480 | |
| VIDEO + 481 | |
| VIDEO + 482 | SECOND BLOCK |
| . | |
| VIDEO + 959 | |
| VIDEO + 960 | |
| VIDEO + 961 | |
| VIDEO + 962 | THIRD BLOCK |
| . | |
| VIDEO + 1439 | |
| VIDEO + 1440 | |
| VIDEO + 1441 | |
| VIDEO + 1442 | FOURTH BLOCK |
| . | |
| VIDEO + 1919 | |
| VIDEO + 1920 | |
| VIDEO + 1921 | |
| VIDEO + 1922 | FIFTH BLOCK |
| . | |
| VIDEO + 2399 | |
| VIDEO + 2400 | |
| VIDEO + 2401 | |
| VIDEO + 2402 | SIXTH BLOCK |
| . | |
| VIDEO + 2879 | |
| VIDEO + 2880 | |
| VIDEO + 2881 | |
| VIDEO + 2882 | SEVENTH BLOCK |
| . | |
| VIDEO + 3359 | |

Note:
1. Within each block depth is indexed as in the target data range table
2. Columns within the block are MSB justified to more recent time.

APPENDIX X

Pseudocode Main Program Listing

| INPUT | PROCESS | OUTPUTS |
|---|---|---|
| | BEGIN | |
| | 100 Main Program | |
| DTT | 110 Diagnostics | Display |
| | 111 Initialize | All internal registers, dedicated registers, display, RAM tables |
| | 112 DO until forever | |
| | 121* TRANSMIT | I/O-XMIT |
| I/O-DET, SENS, SENST, STC | 122 RECEIVE (includes STC) | I/O-SENS SENS RAT |
| | 123 Analyze data: | |
| RAT, LOTAB | 1231* M-of-N filter | RAT |
| RAT, SENS, SPOOL, AUTOC, AGUL, AGLL, ACUL, ACLL, LOCK, SENSET | 1232* AUTO SENSITIVITY | SENS, SPOOL AUTOC |
| RAT, AUTO, UPPER, LOWER, FIND, LOOSE FINDUL, LOOSUL, LOCK | 1233 BOTTOM | UPPER, LOWER, FIND, LOOSE, LOCK |
| AUTO, DEPTH, UPPER1, | 1234 AUTO RANGE | DEPTH, |

APPENDIX X-continued

Pseudocode Main Program Listing

| INPUT | | PROCESS | OUTPUTS |
|---|---|---|---|
| LOCK, ZOOM, DEPTHK | | | DEPTHK |
| ALARM, ALDEP, VIDEO | 1235 | ALARM | buzzer |
| RAT, BLOCK, COLUMN | 124* | UPDATE VIDEO RAM | VIDEO MEMORY, BLOCK, COLUMN |
| AUTO, SENS, ZOOM, DEPTH, REGION, DEPTH, VIDEO, BLOCK, COLUMN, LOTAB | 125* | UPDATE DISPLAY | DISPLAY, UPDATE, PAGE |
| | | END DO | |
| | END | | |

*Not Interruptable

APPENDIX XI

Pseudocode For Interrupt Handling

| INPUTS | INDEX | PROCESS | OUTPUTS |
|---|---|---|---|
| | BEGIN | | |
| | 20 | External interrupt service routine | |
| I/O-KEYBOARD | 21 | Scan Keyboard | KEY #, REPEAT, ERROR |
| CASE | 22 | Case Select (Key = Index) | |
| STOP, AUTO, SENS | | 221 Increase Sensitivity | AUTO, SENS ERROR, REPEAT |
| STOP, AUTO SENS | | 222 Decrease Sensitivity | AUTO, SENS ERROR, REPEAT |
| STOP, AUTO | | 223 Automatic/ Manual | AUTO, SENS ERROR |
| STOP, SPEED | | 224 Increase Sweep Speed | SPEED, ERROR, REPEAT |
| STOP, SPEED | | 225 Decrease Sweep Speed | SPEED, ERROR, REPEAT |
| DEPTH, REGION, ZOOM | | 226 Advance Depth | DEPTH, REGION |
| I/O-LIGHT, LIGHT | | 227 Light On/Off | I/O-LIGHT, LIGHT |
| STOP, BLOCK, COLUMN, BLOCK1, COLUMN1, REVC | | 228 Forward | BLOCK, COLUMN, ERROR, REPEAT, REVC, FSTRPT |
| STOP, BLOCK, COLUMN, BLOCK1, COLUMN1, REVC | | 229 Reverse | BLOCK COLUMN, ERROR, REPEAT, REVC, FSTRPT |
| STOP, BLOCK, COLUMN BLOCK1, COLUMN1 | | 22A Stop/Resume | STOP, BLOCK, COLUMN, BLOCK1, COLUMN1, REVC |
| ZOOM | | 22B Zoom On/Off | ZOOM |
| REGION, DEPTH, LOTAB | | 22C ZOOM REGION UP | REGION, REPEAT, FSTRPT |
| REGION, DEPTH, LOTAB | | 22D ZOOM REGION DOWN | REGION, REPEAT, FSTRPT |
| DEPTH, ALDEP | | 22E ALARM UP/ DOWN | ALDEP |
| ERROR, REPEAT, NODLY AUTO, SENS, ZOOM VIDEO, BLOCK, COLUMN, PAGE DEPTH, LOTAB REGION, FSTRPT | | 23 RETURN | ERROR, REPEAT, NODLY, DISPLAY, PAGE |
| | END | | |

APPENDIX XII

| | | |
|---|---|---|
| Pseudocode: | 121 | TRANSMIT |
| Function: | | This routine turns the transmitter on. |

Logic:
BEGIN
Initialize
Disable Interrupt
Output 20 cycles
Turn transmitter Off
Enable Interrupt
END

APPENDIX XIII

| | | |
|---|---|---|
| Pseudocode: | 122 | RECEIVE (Includes STC) and M-of-N filter |
| Function: | | This routine fills one column in the target data range table with target data. |

| RAT | BIT7 | BIT6 | BIT5 | BIT4 | BIT3 | BIT2 | BIT1 | BIT0 |
|---|---|---|---|---|---|---|---|---|
| Before RECEIVE | x | x | x | x | x | S2 | S1 | X |
| After RECEIVE | x | x | x | x | S2 | S1 | S0 | VIDEO |

Logic:
BEGIN
Delay for end sampling
Initialize RAT pointer and I/O-SENS
DO until RAT pointer = end of RAT
  Get I/O-DET
  DO 1231 (Calculate M of N filter output (VIDEO))
  END DO
  Put I/O-DET and VIDEO in RAT at RAT pointer
  Advance RAT pointer
  IF RAT pointer = STC (Sensitivity time control)
    THEN look up I/O-SENS in SENST and output I/O-SENS
    ELSE nothing
  END IF
END DO
END Notes:
1. The time between consecutive samples (i.e. Get I/O-DET) must be 104 microseconds.
2. The RAT pointer can be in scratch pad.

APPENDIX XIV

| | | |
|---|---|---|
| Pseudocode: | 1231 | M-of-N FILTER (part of RECEIVE) |
| Function: | | This routine examines every row in the target data range table; if the last three columns of any row contain two or more ones, then the VIDEO bit is set for that row. |

| RAT | BIT7 | BIT6 | BIT5 | BIT4 | BIT3 | BIT2 | BIT1 | BIT0 |
|---|---|---|---|---|---|---|---|---|
| Before filter | x | x | x | x | x | S2 | S1 | S0 |
| After filter | x | x | x | x | S2 | S1 | S0 | VIDEO |

Logic:
BEGIN
Initialize RAT pointer
Disable interrupt
DO until RAT pointer = end of RAT
  Get byte from RAT
  Filter byte by referencing Filter Look-Up Table
  Put filtered byte in RAT
  Advance RAT pointer
END DO
Enable interrupt
END Note:
The RAT pointer can be in scratch pad.

APPENDIX XV

| | | |
|---|---|---|
| Pseudocode: | 1232 | AUTO SENSITIVITY module |
| Function: | | This routine examines the VIDEO data in the target data range table that is generated by the M-of-N filter and adjusts the sensitivity (SENS) according to the average amount of data. |

Logic:
BEGIN
Count all the VIDEO bits in the RAT between UPPER and LOWER
Disable interrupt
Spool the count circularly
Enable interrupt
SUM the entries in the spool
IF AUTO = 1
  THEN IF LOCK = 1
    THEN look-up minimum sensitivity (SENS), ASUL and ASLL in SENSET
    ELSE sensitivity = 3, ASUL = DEFAULT, ASLL = DEFAULT
  END IF
  IF SUM > Auto sensitivity upper limit (ASUL)
    THEN increment AUTOC
      Do not exceed AUTOC upper limit (ACUL)
    ELSE nothing
  END IF
  IF SUM < Auto sensitivity lower limit (ASLL)
    THEN decrement AUTOC
      Do not pass AUTOC lower limit (ACLL)
    ELSE nothing
  END IF
  IF AUTOC = ACUL
    THEN decrement SENS
      Do not pass zero
      AUTOC = (ACUL + ACLL)/2
    ELSE nothing
  END IF
  IF AUTOC = ACLL
    THEN increment SENS
      Do not pass 14
      AUTOC = (ACUL + ACLL)/2
    ELSE nothing
  END IF
  IF SENS < minimum sensitivity
    THEN SENS = minimum sensitivity
    ELSE nothing
  END IF
  ELSE nothing (not in auto mode)
END IF
END

APPENDIX XVI

| | | |
|---|---|---|
| Pseudocode: | 1233 | BOTTOM module |
| Function: | | This routine examines the VIDEO data in the target data range Table and mark the upper and lower limits of the bottom return. |

Logic:
BEGIN
Find the widest target that is between UPPER + 10 feet
and LOWER - 10 feet (Give a 1 foot advantage
to higher targets).
IF a good bottom is found (i.e. the widest target is >1 foot)
  THEN increment FIND register (every time bottom found)
    Set UPPER, LOWER to upper and lower depths of widest target
    Do not pass FIND upper limit (FINDUL)
    IF FIND = FINDUL
      THEN LOCK = 1, LOOSE = 0, UPPER1 = UPPER
      ELSE nothing
    END IF
  ELSE FIND = 0
    UPPER = 5 feet and LOWER = 118 feet
    Increment LOOSE
    Do not pass LOOSE upper limit (LOOSUL)
    IF LOOSE = LOOSUL
      THEN LOCK = 0
      ELSE nothing
    END IF

APPENDIX XVI-continued

```
END IF
IF AUTO = 1
THEN IF LOCK = 1
     THEN change VIDEO data in RAT to one's from UPPER1
       to end
       ELSE change all VIDEO data in RAT to zeros
     END IF
ELSE nothing
END IF
END
```

APPENDIX XVII

| Pseudocode: | 1234 | AUTO RANGE module |
|---|---|---|
| Function: | | This routine adjusts the depth range to keep the bottom from going off the display |

```
Logic:
BEGIN
IF AUTO = 1, ZOOM = 0, and LOCK = 1
  THEN look up new DEPTH range in RANGET with UPPER1
    IF new DEPTH is shallower than old
      THEN DEPTHK = DEPTHK-1
        IF DEPTHK = 0
          THEN DEPTH = New (shallower) depth
            an DEPTHK = 5
            IF REGION > max REGION
              THEN REGION = max REGION
              ELSE nothing
            END IF
          ELSE nothing
        END IF
      ELSE DEPTH = New (deeper) DEPTH and DEPTHK = 5
        IF REGION > max REGION
          THEN REGION = max REGION
          ELSE nothing
        END IF
    END IF
  ELSE nothing
END IF
END
```

APPENDIX XVIII

| Pseudocode: | 1235 | ALARM module |
|---|---|---|
| Function: | | This routine examines the most recent return in the target data range table, and triggers the audible alarm if a target is detected at a depth less than ALDEP, the "alarm depth". |

```
Logic
BEGIN
IF ALARM = 1
  THEN get ALDEP
    Initialize RAT pointer
    Turn off buzzer
    DO UNTIL RAT pointer = ALDEP
      Examine VIDEO
      IF VIDEO = 1 (a target)
        THEN turn on buzzer
        ELSE Nothing
      END IF
      Advance RAT pointer
    END DO
  ELSE Nothing
END IF
END
```

APPENDIX XIX

| Pseudocode: | 124 | UPDATE VIDEO RAM |
|---|---|---|
| Function: | | This routine copies the VIDEO data in the target data range table to video memory. |

```
Logic:
BEGIN
Disable interrupt
Decrement UPDATE
```

APPENDIX XIX-continued

```
IF UPDATE = 0
  THEN advance BLOCK and COLUMN
  ELSE nothing
END IF
Initialize video memory pointer
Initialize RAT pointer
DO UNTIL RAT pointer = RAT + 480
  Get VIDEO bit from RAT
  Put bit in video memory
  Advance video memory pointer
  Advance RAT pointer
END DO
Enable interrupt
END
```

APPENDIX XX

| Pseudocode: | 125 | UPDATE DISPLAY |
|---|---|---|
| Function: | | This routine updates the display module 32 with all the latest annunciator and target information. |

```
Logic:
BEGIN
IF UPDATE = 0
THEN set UPDATE according to SPEED and SPEEDT
Calculate VIDEO MEMORY INCREMENT as follows:
```

| ZOOM | DEPTH RANGE | VIDEO MEMORY INCREMENT |
|---|---|---|
| ON | DON'T CARE | 3 inches |
| OFF | 15 feet | 3 inches |
| OFF | 30 feet | 6 inches |
| OFF | 60 feet | 12 inches |
| OFF | 120 feet | 24 inches |

```
IF ZOOM is ON
  THEN VIDEO MEMORY POINTER = REGION
  ELSE VIDEO MEMORY POINTER = 0
END IF
DTT POINTER = top of target area
DO UNTIL DTT POINTER = bottom of target area
  Get a number of rows of target data from
    video memory starting from the VIDEO MEMORY
    POINTER and extending to VIDEO MEMORY POINTER +
    VIDEO MEMORY INCREMENT
  Compress these rows into one row by logically
    ORing bits that are in the same column
  Justify the compressed row so that the most
    recent bit corresponds to the right side of
    the display
  Put the justified compressed row into the DTT
    at the row pointed to by the DTT POINTER
  VIDEO MEMORY POINTER = VIDEO MEMORY POINTER
    + VIDEO MEMORY INCREMENT
  DTT POINTER = DTT POINTER + 1 ROW
END DO
Move sensitivity cursor data to DTT
Move zoom cursor data to DTT
Move alarm cursor data to DTT
Move AUTO, DEPTH, and ZOOM annunciators to DTT
Transfer DTT to display memory in LCD module
ELSE nothing
END IF
END
```

APPENDIX XXI

| Pseudocode: | 22C, 22D | ZOOM REGION UP, DOWN |
|---|---|---|
| Function: | | These routines decrease or increase the depth of the zoom region. |

```
Logic:
BEGIN (UP)
FSTRPT = 1
Calculate size of one pixel at current depth using LOTAB
Subtract this from REGION (do not pass 0)
IF REGION = 0
  THEN ERROR = 1
  ELSE nothing
END IF
```

APPENDIX XXI-continued

```
REPEAT = 1
GOTO return from interrupt
END
BEGIN (DOWN)
FSTRPT = 1
Calculate size of one pixel at current depth using LOTAB
Add this to REGION (do not pass depth range minus 7.5 feet for
15 or 30 foot scale, 15 feet for other scales)
IF REGION = max
   THEN ERROR = 1
   ELSE nothing
END IF
REPEAT = 1
GOTO return from interrupt
END
```

APPENDIX XXII

Pseudocode: 21 SCAN KEYBOARD and 22 CASE SELECT
Function: This routine find the key that caused the interrupt. The key number is used as an index to the appropriate key routine.

```
Logic:
BEGIN
Reset the stack pointer
Beep the buzzer
REPEAT = 0
ERROR = 0
Find the switch that is closed
Look up starting address of appropriate key routine in
case table (not illustrated)
GOTO that address to handle switch
END
```

Note:
The stack pointer is reset because no return from interrupt will be executed.

What is claimed is:

1. An apparatus for displaying information in an echo ranging depth sounder, comprising:
   sonar pulse generating means;
   transducer means responsive to reflected sonar pulses for acquiring target data representative of reflected sonar pulses, said target data comprising a plurality of data samples, each of said data samples corresponding to a predetermined depth increment;
   addressable memory means for storing said target data;
   display means for displaying stored target data retrieved from said memory means and scaled to a first depth scale; and
   scale changing means for replacing at least some previously displayed stored target data on said display means with stored target data retrieved from said memory means and scaled to a second depth scale,
   whereby changing the scale on the display causes at least some information previously displayed on said display means at said first depth scale to be replaced with information at said second depth scale.

2. The improved display of claim 1, further comprising bottom detecting means responsive to said target data for detecting the bottom of a body of water, and wherein said scale changing means automatically displays said target data in said second format in response to detection of a bottom at a depth corresponding to said second depth scale.

3. An apparatus for displaying information in an echo ranging depth sounder, comprising:
   sonar pulse generating means;
   transducer means responsive to reflected sonar pulses for acquiring target data representative of reflected sonar pulses;
   addressable memory means for storing said target data in a predetermined number of arrays, each one of said arrays storing data corresponding to sonar returns from a single sonar pulse to a predetermined depth setting;
   display means for simultaneously displaying data corresponding to said predetermined number of arrays of stored target data retrieved from said memory means in a first format corresponding to a first depth scale not exceeding said predetermined depth setting; and
   scale changing means operative to cause said display means to replace previously displayed data corresponding to said predetermined number of arrays of stored target data with data in a second format different from said first format corresponding to a second depth scale,
   whereby changing the scale on the display causes information previously displayed on said display means in said first format to be reformatted and replaced with information in said second format.

4. An echo ranging sonar depth sounding apparatus, comprising:
   sonar transducer means for generating sound pulses in response to an input signal and for providing an echo signal in response to reflected sound pulses;
   receiver means responsive to said echo signal for amplifying said echo signal to provide electrical target signals;
   addressable memory means for storing said target signals in a plurality of addressable locations;
   control means for storing said target signals in said memory means, and for retrieving stored target signals from said memory means for display; and
   display means responsive to retrieved target signals for displaying said retrieved target signals, said display means being selectably operative to scroll said retrieved target signals forward or backward on a display screen.

5. The apparatus of claim 4, wherein said display means displays retrieved target signals corresponding to a first sonar return in a linear array at a predetermined first location, and wherein said display means displays retrieved target signals corresponding to a previous sonar return at a predetermined second location.

6. The apparatus of claim 5, wherein said display means is operative to display retrieved target signals corresponding to the most recent sonar return at said first location, and is operative to display retrieved target signals corresponding to a plurality of prior sonar returns at a plurality of locations subsequent to said first location.

7. The apparatus of claim 5, wherein said display means is operative to display retrieved target signals corresponding to a particular predetermined sonar return at successive locations on said display, whereby the most recent sonar return is always displayed at said predetermined first location, and is therafter successively shifted one position in a predetermined direction as new sonar returns are received.

8. The apparatus of claim 4, wherein said display means is operative to display retrieved target signals in a first format corresponding to a first depth scale less than or the same as a predetermined depth setting, and further comprising scale changing means for replacing at least some of said retrieved target signals previously displayed on said display means with stored target data in a second format corresponding to a second depth scale, whereby changing the scale on the display causes at least some information displayed on said display means in said first format to be replaced with information in said second format.

9. The apparatus of claim 8, further comprising bottom detecting means responsive to said target signals for detecting the bottom of a body of water, and wherein said scale changing means automatically displays said retrieved target signals in said second format in response to detection of a bottom at a depth corresponding to said second depth scale.

10. The apparatus of claim 4, further comprising operator control means for selecting forward or backward scrolling by said display means.

11. The apparatus of claim 4, wherein said addressable locations in said memory means comprises a predetermined first number of arrays, each one of said arrays storing data.

12. An apparatus for displaying information in an echo ranging depth sounder, comprising:

sonar pulse generating means;

transducer means responsive to reflected sonar pulses for acquiring target data representative of reflected sonar pulses;

addressable memory means for storing target data;

display means for displaying target data retrieved from said memory means on a display in a first format corresponding to a first depth scale not exceeding a predetermined depth setting; ;p1 means for selecting a predetermined portion of target data displayed by said display means in a depth range between a first predetermined depth and a second predetermined depth;

means for generating a selectively positionable cursor on said display means, said cursor corresponding to said depth range, target data corresponding to depths within said depth range being selected for display by said selecting means; and means for replacing on said display means at least some data previously displayed in said first format with said predetermined portion of said target data retrieved from said memory means and reformatted to a second format different from said first format and corresponding to said depth range, whereby a selectable portion of sonar returns displayed on said display corresponding to a particular range of depths can be displayed.

13. The improved display of claim 12, wherein said display includes depth indicia corresponding to the operative range of depths for said depth sounder, and wherein said selectively positionable cursor continuously relates to said depth indicia so that an operator can associate target data displayed with said depth indicia.

14. The improved display of claim 12, wherein said selecting means is operative to allow selection of said predetermined portion of target data from any portion of target data displayed on said display.

15. The improved display of claim 12, further comprising operator control means for positioning said cursor on said display along a variably selectable range of depths.

16. An echo ranging sonar apparatus, comprising:

sonar pulse generating means;

transducer means responsive to reflected sonar pulses for acquiring target data representative of reflected sonar pulses;

addressable memory means for storing said target data;

display means for displaying stored target data retrieved from said memory means in one of a plurality of depth scales;

bottom locking means responsive to target data stored in said memory means for distinguishing the bottom of a body of water from other target data and for locking to the bottom of the body of water, display adjusting means responsive to said bottom locking means for adjusting said display means to keep the bottom from going off the display;

zoom means for selecting a predetermined portion of target data displayed by said display means; and means for generating a zoom cursor onn said display means for associating indicia on said display means with a depth, said display adjusting means being operative to change the width of said zoom cursor for different depth scales, 17. In an apparatus for displaying information in an echo ranging depth sounder including sonar pulse generating means and transducer means responsive to reflected sonar pulses for acquiring target data representative of reflected sonar pulses, an improved information display, comprising:

addressable memory means for storing said target data;

bottom detecting means responsive to target data stored in said memory means for distinguishing the bottom of a body of water from other targets and for providing bottom data corresponding to target data representative of the bottom of the body of water; and display means for displaying target data retrieved from said memory means with indicating indicia on a display area, said display means being responsive to said bottom data to fill said display area corresponding to depths greater than the detected bottom of the body of water with said indicating indicia, whereby areas on said display area beneath the bottom are solidly filled in to indicate to an operator the bottom of the body of water.

18. The improved display of claim 17, wherein said display means displays target data retrieved from said memory means in a first format corresponding to a first predetermined depth scale, and further comprising scale changing means responsive to display said target data on said display means in a second format corresponding to a second predetermined depth scale, whereby changing the scale on the display causes all information displayed on said display means in said first format to be reformatted to said second predetermined depth scale.

19. The improved display of claim 18, wherein said scale changing means automatically displays said target data in said second format in response to detection of a bottom at a depth corresponding to said second depth scale.

20. An apparatus for displaying information in an echo ranging depth sounder, comprising:

sonar pulse generating means;

transducer means responsive to reflected sonar pulses for acquiring target data representative of reflected sonar pulses;

addressable memory means for storing said target data;

display means for displaying target data retrieved from said memory means;

scale changing means responsive to format said target data retrieved from said memory means corresponding to sonar returns up to a first predetermined depth in a first format corresponding to a first predetermined depth scale and responsive to a scale change signal to format target data retrieved from said memory means corresponding to sonar returns up to a second predetermined depth in a second format corresponding to a second predetermined depth scale; and display updating means associated with display means for replacing target data displayed on said display means in said first format with target data in said second format in response to said scale changing means changing from said first format to said second format, whereby changing the scale on the display causes at least some information displayed on said display means in said first format to be reformatted and replaced with information in said second format.

21. The improved display of claim 20, further comprising bottom detecting means responsive to said target data for detecting the bottom of a body of water, and wherein said display updating means automatically displays said target data in said second format in response to detection of a bottom at a depth corresponding to said second depth scale.

22. The improved display of claim 21, wherein said bottom detecting means provides said scale change signal in response to detection of sonar returns corresponding to the bottom of said body of water exceeding said first predetermined depth.

23. The improved display of claim 20, further comprising means for selecting a predetermined portion of target data displayed by said display means, said predetermined portion corresponding to a predetermined range of depths;

means for displaying only said predetermined portion of said target data on said display means such that only sonar returns corresponding to said predetermined range or depths are displayed.

24. The improved display of claim 23, wherein said display updating means is operative to reformat target data displayed in said first format to a third format corresponding to a third depth scale corresponding to said predetermined range of depths.

25. The improved display of claim 20, wherein said memory means stores target data for a first predetermined number of sonar returns, and wherein said display means displays target data for a second predetermined number of sonar returns less than said first predtermined number.

26. The improved display of claim 25, further comprising reversing means for retrieving target data from said memory means corresponding to sonar returns not presently being displayed by said display means such that said display means displays the older sonar returns stored in said memory means.

27. The apparatus of claim 20, wherein said display means displays retrieved target signals corresponding to a first sonar return at a predetermined first location on said display, and wherein said display means displays retrieved target signals corresponding to a sonar return prior in time to said first sonar return at a predetermined second location on said display.

28. The apparatus of claim 27, wherein said display means in operative to display retrieved target signals corresponding to the most recent sonar return at said first location, and is operative to display retrieved target signals corresponding to a plurality of previous sonar returns at a plurality of predetermined locations on said display subsequent to said first location.

29. The apparatus of claim 27, wherein said display means is operative to successively display retrieved target signals corresponding to a particular predetermined sonar return at successive locations on said display, whereby the most recent sonar return is always displayed at a predetermined first location, and is thereafter successively shifted one position in a predetermined direction as new sonar returns are received.

30. The improved display of claim 20, wherein said memory means stores target data corresponding to sonar returns from targets located within a predetermined depth limit, and wherein said display means displays target data corresponding to sonar returns from targets located within a predetermined depth range less than said predetermined depth limit.

31. The improved display of claim 20, wherein said memory means is a display memory and stores a quantity of target data the same as the quantity of data displayed by said display means.

32. The improved display of claim 20, wherein said memory means stores a quantity of target data greater than the quantity of data displayed by said display means.

33. The improved display of claim 20, wherein said memory means stores target data at a constant resolution up to a predetermined depth limit, whereby each location in said addressable memory stores target data corresponding to a predetermined depth increment.

34. The improved display of claim 20, wherein said memory means stores target data at a first resolution up to a predetermined first depth limit, and stores target data at a second resolution beyond said first depth limit, whereby a plurality of first locations in said addressable memory store target data corresponding to a predetermined first depth increment while a plurality of second locations in said addressable memory store target data corresponding to a predetermined second depth increment.

35. An apparatus for displaying information in an echo ranging depth sounder, comprising:

sonar pulse generating means;

transducer means responsive to reflected sonar pulses for acquiring target data representative of reflected sonar signal returns;

addressable memory means for storing said target data corresponding to a predetermined number of sonar singal returns;

display means for displaying target data retrieved from said memory means, said display means simultaneously displaying a plurality of retrieved sonar signal returns less than said predetermined number stored in said memory means; and scrolling means selectably operative for causing said display means to successively shift a displayed plurality of sonar signal returns in one direction as new sonar signal returns are received or alternatively to successively shift a displayed plurality of sonar signal returns in the opposite direction.

36. The apparatus of claim 35, wherein said scrolling means is operative for causing said display means to retrieve and display previously displayed stored sonar signal returns from said memory and to successively shift a plurality of sonar singal returns in said opposite direction as said retrieved previously displayed sonar returns are displayed.

37. The apparatus of claim 36, wherein said display means is operative to display retrieved sonar signal returns corresponding to the most recent sonar return at a predetermined position on said display means, and to display retrieved sonar signal returns corresponding to previously displayed and stored target data at an opposite position to said predetermined position on said display means.

38. In an apparatus for displaying information in an echo ranging depth sounder including sonar pulse generating means and transducer means responsive to reflected sonar pulses for acquiring target data representative of reflected sonar pulses, an improved information display, comprising:
 addressable memory means for storing said target data;
 bottom detecting means responsive to target data stored in said memory means for detecting the bottom of a body of water and for providing bottom data corresponding to target data representative of the bottom of the body of water;
 display means for displaying target data retrieved from said memory means with indicating indicia on a display area,
 said display means being responsive to said bottom data to fill said display area corresponding to depths greater than the detected bottom of the body of water with said indicating indicia, said display means being operative to display target data retrieved from said memory means in a first format corresponding to a first predetermined depth scale; and
 scale changing means operative to display said target data on said display means in a second format corresponding to a second predetermined depth scale.
 whereby areas on said display area beneath the bottom are solidly filled in to indicate to an operator the bottom of the body of water, and whereby changing the scale of said display means causes all information displayed on said display means in said first format to be reformatted to said second predetermined depth scale.

39. The improved display of claim 38, wherein said scale changing means automatically displays said target data in said second format in response to detection of a bottom at a depth corresponding to said second depth scale.

40. An apparatus for displaying information in an echo ranging depth sounder, comprising:
 sonar pulse generating means;
 transducer means responsive to reflected sonar pulses for acquiring target data representative of reflected sonar pulses;
 addressable memory means for storing said target data, said memory means storing target data for a first predetermined number of sonar returns;
 display means for displaying target data retrieved from said memory means on a display in a first format corresponding to a first depth scale not exceeding a predetermined depth setting, said display means displaying target data for a second predetermined number of sonar returns less than said first predetermined number;
 means for selecting a predetermined portin of target data displayed by said display means in a depth range between a first predetermined depth and a second predetermined depth; and
 means for replacing on said display means at least some data previously displayed in said first format with said predetermined portin of said target data retrieved from said memory means and reformatted to a second format different from said first format and corresponding to said depth range,
 whereby a selectable portion of sonar returns displayed on said display corresponding to a particular range of depths can be displayed.

41. The improved display of claim 40, further comprising reversing means for retrieving target data from said memory means corresponding to sonar returns not presently being displayed by said display means such that said display means displays the older sonar returns stored in said memory means.

42. An echo ranging sonar apparatus, comprising:
 sonar pulse generating means;
 transducer means responsive to reflected sonar pulses for acquiring target data representative of reflected sonar pulses;
 addressable memory means for storing said target data;
 display means for displaying stored target retrieved from said memory means in one of a plurality of depth scales, said display means being operative to display stored target data in a first format corresponding to a first depth scale;
 bottom locking means responsive to target data stored in said memory means for distinguishing the bottom of a body of water from other target data and for locking to the bottom of the body of water; and
 means associated with said display means for replacing at least some previously displayed stored target data on said display means with stored target data in a second format corresponding to a second depth scale.

* * * * *